(12) United States Patent
Kamm et al.

(10) Patent No.: US 7,789,792 B2
(45) Date of Patent: Sep. 7, 2010

(54) MULTI-SPEED TRANSMISSION

(75) Inventors: Michael Kamm, Bodnegg (DE); Gabor Diosi, Friedrichshafen (DE); Josef Haupt, Tettnang (DE); Gerhard Gumpoltsberger, Friedrichshafen (DE); Peter Ziemer, Tettnang (DE); Martin Brehmer, Constance (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 499 days.

(21) Appl. No.: 11/814,101

(22) PCT Filed: Jun. 29, 2005

(86) PCT No.: PCT/EP2005/006989

§ 371 (c)(1),
(2), (4) Date: Feb. 8, 2008

(87) PCT Pub. No.: WO2006/074707

PCT Pub. Date: Jul. 20, 2006

(65) Prior Publication Data

US 2010/0048344 A1   Feb. 25, 2010

(30) Foreign Application Priority Data

Jan. 17, 2005   (DE) .................... 10 2005 002 337

(51) Int. Cl.
   *F16H 37/06* (2006.01)
(52) U.S. Cl. .................. 475/330; 475/277; 475/282
(58) Field of Classification Search .......... 475/269, 475/275, 277, 282, 296, 311, 317, 330
   See application file for complete search history.

(56) References Cited

U.S. PATENT DOCUMENTS

| | | | |
|---|---|---|---|
| 4,395,925 | A | 8/1983 | Gaus |
| 4,683,776 | A | 8/1987 | Klemen |
| 6,176,803 | B1 | 1/2001 | Meyer et al. |
| 6,558,287 | B2 | 5/2003 | Hayabuchi et al. |
| 6,634,980 | B1 | 10/2003 | Ziemer |
| 6,960,149 | B2 | 11/2005 | Ziemer |
| 7,018,319 | B2 | 3/2006 | Ziemer |
| 7,699,736 | B2 * | 4/2010 | Diosi et al. ............ 475/5 |
| 7,736,264 | B2 * | 6/2010 | Moorman et al. ........ 475/277 |
| 2002/0119859 | A1 | 8/2002 | Raghavan et al. |

(Continued)

FOREIGN PATENT DOCUMENTS

DE   29 36 969 A1   4/1981

(Continued)

*Primary Examiner*—David D Le
*Assistant Examiner*—Justin Holmes
(74) *Attorney, Agent, or Firm*—Davis & Bujold, P.L.L.C.

(57) ABSTRACT

A transmission having input and output shafts, gearsets (RS1-RS4), shafts (1-8) and elements (A-E). Carriers of gearsets (RS4, RS3) are respectively connected to the input and the output forming shafts (1, 2). Sun gears of gearsets (RS1, RS4) are coupled forming shaft (3). The ring gear and a carrier respectively of gearsets (RS1, RS2) form shafts (4, 8). Ring gears of gearsets (RS2, RS4) respectively couple sun gears of gearsets (RS3, RS2) forming shafts (5, 7). A carrier of gearset (RS1) and a ring gear of gearset (RS3) are connected forming shaft (6). In the power flow, elements (A, B) are respectively arranged between shafts (3, 4) and a transmission housing, element (C) between shafts (5, 1), element (D) between shafts (8, 2) or (8, 6), and element (E) between two of shafts (5, 7, 8).

19 Claims, 13 Drawing Sheets

U.S. PATENT DOCUMENTS

2008/0227587 A1 * 9/2008 Carey et al. .................. 475/283
2008/0234093 A1 * 9/2008 Diosi et al. .................. 475/276

FOREIGN PATENT DOCUMENTS

| DE | 42 38 025 A1 | 5/1994 |
| DE | 199 49 507 A1 | 4/2001 |
| DE | 101 15 983 A1 | 10/2002 |
| DE | 101 15 995 A1 | 10/2002 |
| DE | 102 13 820 A1 | 10/2002 |
| DE | 103 15 709 A1 | 10/2004 |

* cited by examiner

| GEAR | BRAKE | | CLUTCH | | | RATIO i | STEP φ |
|---|---|---|---|---|---|---|---|
| | A | B | C | D | E | | |
| 1 | ● | ● | ● | | | 4.700 | |
| 2 | ● | ● | | | ● | 3.133 | 1.500 |
| 3 | | ● | ● | | ● | 2.143 | 1.462 |
| 4 | | ● | | ● | ● | 1.700 | 1.260 |
| 5 | | ● | ● | ● | | 1.298 | 1.309 |
| 6 | | ● | | ● | ● | 1.000 | 1.298 |
| 7 | ● | | ● | ● | | 0.839 | 1.192 |
| 8 | ● | | | ● | ● | 0.667 | 1.258 |
| R | ● | ● | | ● | | -3.280 | TOTAL 7.05 |

US 7,789,792 B2

MULTI-SPEED TRANSMISSION

This application is a National Stage completion of PCT/EP2005/006989 filed Jun. 29, 2005 which claims priority from German patent application serial no. 10 2005 002 337.1 filed Jan. 17, 2005.

FIELD OF THE INVENTION

The present invention relates to a multi-speed transmission of a planetary design, particularly an automatic transmission for a motor vehicle.

BACKGROUND OF THE INVENTION

According to the state of the art, automatic transmissions, particularly for motor vehicles, are comprised of planetary gear sets, which are shifted using friction and/or shifting elements, such as clutches and brakes, and which are typically connected to a starting element, that is subject to a slip effect, and optionally provided with a converter lock-up clutch, for example a hydrodynamic torque converter or a fluid clutch.

Such a multi-speed automatic transmission, for example, is presented in DE 102 13 820 A1. In essence, it comprises an input shaft and an output shaft, which are located coaxially in relation to one another, a total of three planetary gear sets and six friction shifting elements. The transmission comprises two power paths for transmitting the torque from the input shaft to the output shaft. Two of the planetary gear sets form a shiftable primary gear set of the transmission in the form of a two-carrier four-shaft planetary gear designed, for example, as a Ravigneaux planetary gear set or as a Simpson planetary gear set. The output element of the primary gear set is connected to the output shaft of the transmission. The remaining one of the three planetary gear sets is configured as a simple planetary gear set and forms a non-shiftable front-mounted gear set, which is rigidly connected to the input shaft and produces a rotational speed on the output side, which is transmittable to the various input elements of the primary gear set. At any given time, by selectively locking two of the six friction shifting elements, configured as clutches and brakes, a total of eight forward gears can be engaged without range shifts, which is to say, that they can be shifted in such a way that during a change from one gear to the next higher or lower gear, only one of the previously engaged shifting elements is disengaged and a previously disengaged shifting element is engaged.

From DE 199 49 507 A1 by the applicant, a multi-speed transmission is also known, according to which, on the drive shaft two non-shiftable, front-mounted planetary gear sets are provided, which on the output side generate two rotational speeds which, in addition to the rotational speed of the input shaft, can be selectively switched by closing the control elements of two different input elements of a shiftable multi-component primary gear set, acting upon the output shaft in such a way that, for shifting from one gear to the next higher or next lower gear, of the two actuated control elements, only one control element must be engaged or disengaged. The primary gear set, in turn, is configured as a two-carrier four-shaft planetary gear set, the two planetary gear sets thereof being rigidly coupled to each other via two elements. When using five shifting elements, seven forward gears can be shifted into without range shifts, and when using six shifting elements, nine or ten forward gears can be shifted into.

Within the scope of DE 101 15 983 A1 by the applicant, a multi-speed transmission is described, comprising a drive shaft that is coupled with a front-mounted gear set, an output shaft that is connected with a rear-mounted gear set, and a maximum of seven shifting elements, through selective shifting at least eight forward gears can be shifted into without range shifting. The front-mounted gear set is formed by a shiftable or non-shiftable planetary gear set or of a maximum of two non-shiftable planetary gear sets that are coupled to one another. The rear-mounted gear set is a two-carrier four-shaft gear with two shiftable rear-mounted planetary gear sets and has four free shafts. The first free shaft of this two-carrier four-shaft transmission is connected with the first shifting element, the second free shaft with the second and third shifting elements, the third free shaft with the fourth and fifth shifting elements and the fourth free shaft is connected with the output shaft. According to the invention, a multi-speed transmission with a total of six shifting elements is proposed, which connects the third free shaft or the first free shaft of the rear-mounted gear set additionally with a sixth shifting element. For a multi-speed transmission with a total of seven shifting elements, it is proposed, according to the invention, that the third free shaft is additionally connected with a sixth shifting element and the first free shaft is additionally connected with a seventh shifting element.

A plurality of other multi-speed transmissions are known, for example, from DE 101 15 995 A1 by the applicant, wherein four shiftable planetary gear sets, which are coupled to one another, and six or seven frictionally engaged shifting elements are provided; the selective engagement of these elements transmits a rotational speed from an input shaft of the transmission to an output shaft of the transmission in such a way that nine or eleven forward gears and at least one reverse gear can be shifted into. Depending on the gearshift pattern, in each gear, two or three shifting elements are engaged, wherein during a shift from one gear to the next higher or next lower gear only one engaged shifting element is disengaged and a previously disengaged shifting element is engaged to prevent range shifting.

Furthermore, an 8-gear multi-speed transmission is known from DE 29 36 969 A1, comprising four coaxial simple planetary gear sets and eight friction shifting elements.

Another multi-speed automatic transmission is furthermore known from U.S. Pat. No. 4,683,776, comprising four single planetary gear sets and six friction shifting elements. All four planetary gear sets are configured as negative planetary gear sets in a simple planetary design. The first two planetary gear sets, viewed along the power flow, form a shiftable front-mounted gear set and are rigidly connected to one another via two coupling shafts, wherein the first coupling shaft of this front-mounted gear set rigidly connects the two sun gears thereof to one another as well as rigidly to the input shaft of the transmission, and the second coupling shaft of the front-mounted gear set rigidly connects the ring gear of the first planetary gear set with the planet carrier of the second planetary gear set and at the same time forms the output shaft of the front-mounted gear set. The two other elements of the front-mounted gear set—which is to say the planet carrier of the first planetary gear set and the ring gear of the second planetary gear set—can be fixed in place to the transmission housing via a separate brake. The third and fourth planetary gear sets form a shiftable primary gear set and are likewise rigidly connected to each other via two coupling shafts, wherein the first coupling shaft of this primary gear set rigidly connects the two sun gears thereof and can be connected to the input shaft of the transmission, and the second coupling shaft of the primary gear set rigidly connects the planet carrier of the third planetary gear set to the ring gear of the fourth planetary gear set and can likewise be connected to the input shaft and optionally can be fixed in place to the transmission housing via a brake. The ring gear of the third planetary gear set is a further input element of the primary gear set and is rigidly connected to the output shaft of the front-mounted gear set and can be fixed in place to the transmission housing via a further brake. The planet carrier of the fourth planetary gear set finally forms the output element of the primary gear set and is rigidly connected to the output shaft of the transmission. The transmission has a total of nine range shift-free shiftable forward gears and one reverse gear, which can be implemented by selectively engaging two of the six shifting elements, in pairs.

Furthermore, a 9-speed automatic transmission is known from U.S. Pat. No. 6,176,803 B1, comprising four shiftable simple planetary gear sets that are located coaxially in relation to one another and can also be coupled to one another, wherein this transmission has a strong resemblance to the automatic transmission according to U.S. Pat. No. 4,683,776, described above. Like in U.S. Pat. No. 4,683,776 a total of six friction shifting elements are provided, of which two are configured as multi-disk clutches and four as multi-disk brakes. Unlike in U.S. Pat. No. 4,683,776, the first of the four planetary gear sets, viewed along the power flow, is configured as a positive planetary gear set in a double planet design. As in U.S. Pat. No. 4,683,776, the remaining three planetary gear sets are configured as negative planetary gear sets in a simple planetary design. With the exception of coupling the sun gear of the second planetary gear set to the planet carrier of the first (positive) planetary gear set, the component-related coupling of the planetary gear sets among each other, to the two clutches, the input shaft, or the four brakes and to the output shaft are completely identical to U.S. Pat. No. 4,683,776. In principle, only the positive planetary gear set operates as a front-mounted gear set, whereby the remaining three planetary gear sets form the primary gear set of the transmission.

Similar multi-speed automatic transmissions with nine range shift-free shiftable forward gears are furthermore known from DE 4238025 A1, comprising four coaxial simple planetary gear sets and six or seven friction shifting elements (four multi-disk brakes and two or three multi-disk clutches). The first two planetary gear sets viewed, along the power flow, always form a shiftable front-mounted gear set, which is rigidly connected to the input shaft of the transmission and coupled via two coupling shafts, wherein one of the planetary gear sets is configured as a positive planetary gear set in double planet design and the other planetary gear set as a negative planetary gear set in a simple planet design. The remaining two planetary gear sets form a shiftable primary gear set identical to U.S. Pat. No. 4,683,776, configured as a two-carrier four-shaft planetary gear.

Automatic vehicle transmissions in planetary designs in general have previously been described in the state of the art on many occasions and undergo continuous developments and improvements. These transmissions should have, for example, a sufficient number of forward gears as well as one reverse gear and gear ratios that are excellently suited for motor vehicles, have a high overall ratio spread as well as favorable progressive ratios. Furthermore, they should allow a high starting gear ratio in the forward direction and include a direct gear and to be suitable for use in both passenger cars and commercial vehicles. In addition, these transmissions should have a low complexity, and in particular require a small number of shifting elements and avoid double-shifts when shifting sequentially, so that only one shifting element is engaged when shifting between defined gear groups.

SUMMARY OF THE INVENTION

It is therefore the object of this invention to propose a multi-speed transmission of the kind mentioned above, with at least eight forward gears, that can be shifted without range shifting, and at least one reverse gear, wherein the lowest number of shifting elements is required while using a total of four planetary gear sets. In addition, the transmission should have a wide ratio spread and comparatively harmonic ratios and favorable efficiency in the main driving gears, which is to say comparatively low drag and gearing losses.

According to the invention, a multi-speed transmission of planetary design is proposed, which comprises an input shaft, an output shaft, four planetary gear sets, at least eight rotatable shafts as well as five shifting elements—two brakes and three clutches—, the selective engagement of which produces different gear ratios between the input shaft and the output shaft such that so that eight forward gears and one reverse gear can be implemented.

According to the invention, a planet carrier of the fourth planetary gear set and the input shaft are non-rotatably connected to each other and form the first rotatable shaft of the transmission. A planet carrier of the third planetary gear set and the output shaft are non-rotatably connected to each other and form the second rotatable shaft of the transmission. A sun gear of the first planetary gear set and a sun gear of the fourth planetary gear set are non-rotatably connected to each other and form the third rotatable shaft of the transmission. A ring gear of the first planetary gear set forms the fourth rotatable shaft of the transmission. A ring gear of the second planetary gear set and a sun gear of the third planetary gear set are non-rotatably connected to each other and form the fifth rotatable shaft of the transmission. A planet carrier of the first planetary gear set and a ring gear of the third planetary gear set are non-rotatably connected to each other and form the sixth rotatable shaft of the transmission. A sun gear of the second planetary gear set and a ring gear of the fourth planetary gear set are non-rotatably connected to each other and form the seventh rotatable shaft of the transmission. A planet carrier of the second planetary gear set forms the eighth rotatable shaft of the transmission.

With respect to the connection of the five shifting elements to the different elements of the planetary gear sets and to the input shaft of the transmission, it is proposed, according to the invention, that the first shifting element is located in the power flow between the third shaft and a housing of the transmission, and that the second shifting element is located in the power flow between the fourth shaft and the housing of the transmission, and that the third shifting element is located in the power flow between the fifth and first shafts. Furthermore, according to the invention, the fourth shifting element is located in the power flow either between the eight and second shafts or between the eight and sixth shafts. According to the invention, the fifth shifting element is located in the power flow either between the seventh and fifth shafts, the seventh and eighth shafts or the fifth and eighth shafts. As a result of these different kinematic coupling configurations of the shifting element to the different shafts of the transmission, an entire transmission family is produced according to the invention.

It is preferable if all four planetary gear sets are configured as negative planetary gear sets, with the respective planetary gears meshing with the sun gear and ring gear of the respective planetary gear set. With respect to the spatial configuration of the four planetary gear sets in the transmission housing, it is proposed, in an advantageous embodiment, to dispose all four planetary gear sets coaxially in relation to each other, following a sequential order of "second, fourth, first, third planetary gear sets". For an application according to which the input and output shafts extend coaxially with each other, it is expedient that the second planetary gear set is the planetary gear set of the inventive planetary gear set group facing the drive mechanism of the transmission.

The inventive embodiment of the multi-speed transmission produces gear ratios with large spreads with smooth ratios that are particularly suited for passenger cars, achieving excellent driving comfort and significantly reducing fuel consumption.

In addition, the multi-speed transmission, according to the invention, allows a comparatively low complexity to be achieved, due to a low number of shifting elements, specifically two brakes and three clutches. It is advantageously possible with this multi-speed transmission, to initiate driving with a hydrodynamic converter, an external starting clutch or with other suitable external starting elements. It is also conceivable to allow a starting operation with a starting element integrated in the transmission. For this embodiment, one of the two brakes is preferably suited, as both are engaged in the first and second gears and in the reverse gear.

In addition, the inventive multi-speed transmission produces excellent efficiency in all gears, on the one hand due to low drag losses since in every gear only two shifting elements are disengaged, and on the other hand, due to low gearing losses in the simple individual planetary gear sets.

In addition, the multi-speed transmission, according to the invention, is designed in such a way that it can be adapted to different drive train configurations, both in the power flow direction and with regard to space. For example, it is possible without special design measures to position the input and output of the transmission either coaxially or axially parallel to each other.

BRIEF DESCRIPTION OF THE DRAWINGS

The invention will be explained in more detail hereinafter with reference to illustrated in the figures. Like or comparable components are identified by like reference numerals, wherein.

DETAILED DESCRIPTION OF THE PREFERRED EMBODIMENTS

Figures 1, 2:
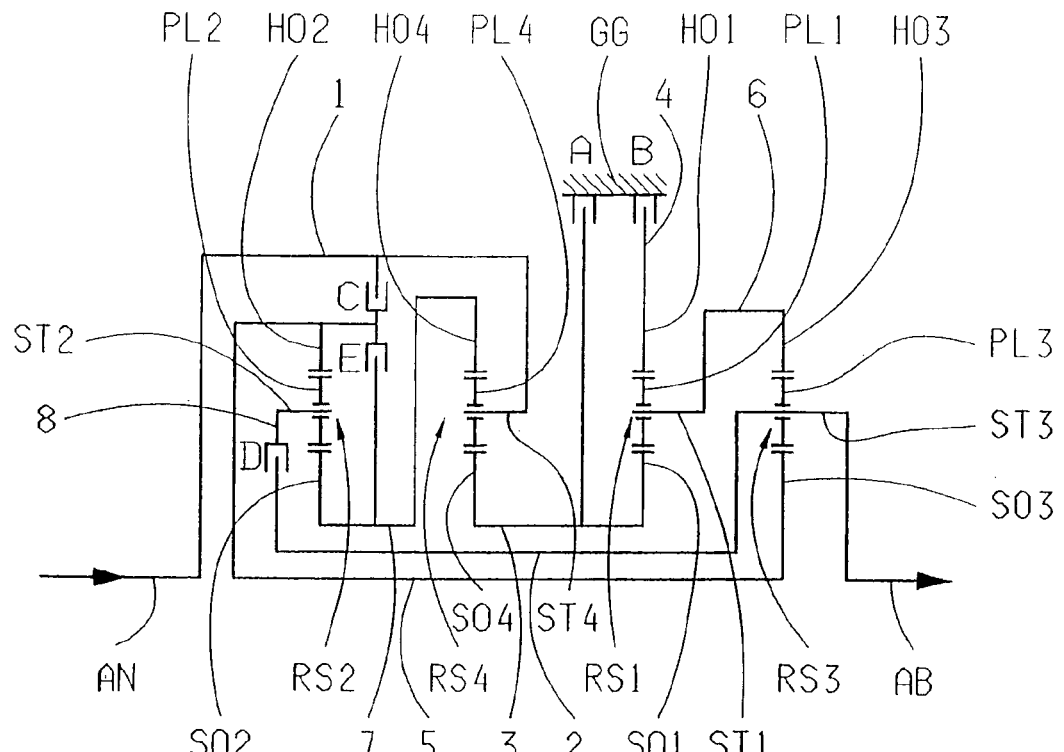
FIG. 1 is a schematic illustration of a first embodiment of a multi-speed transmission according to the invention.
FIG. 2 is a shifting pattern for the multi-speed transmission according to FIG. 1.

FIG. 1 illustrates a first embodiment of a multi-speed transmission according to the invention. The transmission comprises an input shaft AN and an output shaft AB as well as four planetary gear sets RS1, RS2, RS2, RS4 and five shifting elements A, B, C, D, E, which are all arranged in a housing GG of the transmission. All four planetary gear sets RS1, RS2, RS3, RS4 are configured as simple negative planetary gear sets and in this embodiment are located coaxially behind one another in the axial direction in the sequential order of RS2, RS4, RS1, RS3. As is known, a negative planetary gear set comprises planet gears which mesh with the sun gear and ring gear of this planetary gear set. The ring gears of the four planetary gear sets RS1, RS2, RS3, RS4 are labeled with HO1, HO2, HO3 and HO4, the sun gears with SO1, SO2, SO3 and SO4, the planet gears with PL1, PL2, PL3 and PL4 and the planet carriers, on which these planet gears are rotatably mounted, with ST1, ST2, ST3 and ST4. The shifting elements A and B are configured as brakes, which in the illustrated embodiment are both frictionally shiftable multi-disk brakes, in a different embodiment they can of course also be configured as frictionally shiftable band brakes or, for example, as positively shiftable claw or cone brakes. The shifting elements C, D and E are configured as clutches, which in the illustrated example are all configured as frictionally shiftable multi-disk clutches, but in another embodiment can of course be configured as positively shiftable claw or cone clutches.

With selective shifting of these five shifting elements A to E, eight forward gears and at least one reverse gear can be implemented The multi-speed transmission, according to the invention, comprises in total at least eight rotatable shafts, which have been identified with reference numerals 1 to 8.

With respect to coupling the individual elements of the four planetary gear sets RS1, RS2, RS3, RS4 with each other and to the input and output shafts AN, AB, the following is provided in the multi-speed transmission according to FIG. 1: The planet carrier ST4 of the fourth planetary gear set RS4 and the input shaft AN are non-rotatably connected to each other and form the first shaft 1 of the transmission. The planet carrier ST3 of the third planetary gear set RS3 and the output shaft AB are non-rotatably connected to each other and form the second shaft 2 of the transmission. The sun gear SO1 of the first planetary gear set RS1 and the sun gear SO4 of the fourth planetary gear set RS4 are non-rotatably connected to each other and form the third shaft 3 of the transmission. The ring gear HO1 of the first planetary gear set RS1 forms the fourth shaft 4 of the transmission. The ring gear HO2 of the second planetary gear set RS2 and the sun gear SO3 of the third planetary gear set RS3 are non-rotatably connected to each other and form the fifth shaft 5 of the transmission. The planet carrier ST1 of the first planetary gear set RS1 and the ring gear HO3 of the third planetary gear set RS3 are non-rotatably connected to each other and form the sixth shaft 6 of the transmission. The sun gear SO2 of the second planetary gear set RS2 and the ring gear HO4 of the fourth planetary gear set RS4 are non-rotatably connected to each other and form the seventh shaft 7 of the transmission. The planet carrier ST2 of the second planetary gear set RS2 forms the eighth shaft 8 of the transmission.

With respect to coupling the five shifting elements A to E to the shafts 1 to 8 of the transmission, the following is provided in the multi-speed transmission according to FIG. 1: The first shifting element A is located in the power flow between the third shaft 3 and the transmission housing GG. The second shifting element B is located in the power flow between the fourth shaft 4 and the transmission housing GG. The third shifting element C is located in the power flow between the fifth shaft 5 and the first shaft 1. The fourth shifting element D is located in the power flow between the eighth shaft 8 and the second shaft 2. And the fifth shifting element E is located in the power flow between the seventh shaft 7 and the fifth shaft 5.

In the embodiment according to FIG. 1, the second planetary gear set RS2 is the gear set closest to the input and the third planetary gear set RS3 is the gear set closest to the output, wherein the input shaft AN and output shaft AB, for example, are located coaxially in relation to each other. It will be easily apparent to the person skilled in the art, that this transmission can be modified without special effort such that the input and output shafts are no longer located coaxial to each other, and instead axially parallel or at an angle to each other. In such a configuration, the person skilled in the art, if necessary, will also dispose the input of the transmission close to the third planetary gear set RS3, which is to say on the side of the third planetary gear set RS3 facing away from the first planetary gear set RS1.

In accordance with the spatial arrangement, the four gear sets when viewed in the axial direction are in the sequential order of "RS2, RS4, RS1, RS3", some sections of the second shaft 2 of the transmission extend centrally inside the third shaft 3 and some sections extend centrally inside the seventh shaft 7. The fifth shaft 5 extends, on the one hand, in sections centrally inside the second shaft 2; on the other hand, a section of the fifth shaft 5 completely encompasses the clutch D and the second planetary gear set RS2 in the axial and radial directions. The first shaft 1 of the transmission extends entirely across the second and fourth planetary gear sets RS2, RS4 as well as the clutches D, C, E in the axial and radial directions so that the clutches D, C, E are located inside a cylindrical space formed by the shaft 1.

It is furthermore apparent from FIG. 1 that the two brakes A, B, when viewed spatially, are located axially directly adjacent to each other in a region radially above the planetary gear sets RS1 and RS4. The brake B is arranged at least partially radially over the first planetary gear set RS1 and the brake A is located at least partially in a region axially between the two planetary gear sets RS4 and RS1. As a result of the kinematic connection of the two brakes A, B to the two planetary gear sets RS4 and RS1, the brake B is set closer than brake A to the third planetary gear set RS3 or closer to the output of the transmission. The spatial configuration of the two brakes A, B, shown in FIG. 1, is of course shown only by way of example. The brake A can also be arranged at least partially radially over the fourth planetary gear set RS4. Depending on the available installation space for the transmission housing GG in the vehicle, it may be provided, in another embodiment relating to that of the illustration of FIG. 1, the two brakes A, B—are arranged with axially shifted to a region radially over the planetary gear sets RS2 and RS4, radially over the planetary gear sets RS3 and RS1 or axially completely between the planetary gear sets RS4 and RS1. Depending on the available installation space, the brake A can also be arranged, for example, radially inside a cylindrical space formed by the brake B.

It is furthermore apparent from FIG. 1, that from a radial perspective, the two clutches C and E are arranged substantially on top of each other and from an axial perspective they are located between the second planetary gear set RS2 and the fourth planetary gear set RS4, wherein the disk set of the clutch C is arranged at least substantially radially over the disk set of the clutch E. If desired, a common disk carrier may be provided for the two clutches C, D, the carrier being configured, for example, as an interior disk carrier for the radially outer disk set of the clutch C and as an exterior disk carrier for the radially inner disk set of the clutch E. Servo devices of the two clutches C, E, not illustrated for figure simplification, can be combined, for example, with the common disk carrier and the two disk sets into a sub-assembly, so that both servo devices always rotate at the rotational speed of the ring gear HO2 of the second planetary gear set RS2. Both servo devices may have dynamic pressure equalization to compensate for the rotatory pressure of the rotating pressure chambers. However, the servo device of clutch C, may also be mounted separately on the common disk carrier of the two clutches C, E and the servo device of the clutch E may be mounted separately on the sun gear SO2 of the second planetary gear set RS2 in an axially displaceable manner. The servo device of the clutch C, for example, may also be mounted axially displaceably on the input shaft AN, to rotate at the input rotational speed of the transmission.

FIG. 1 furthermore illustrates that from a spatial perspective the clutch D is located on the side of the second planetary gear set RS2 facing away from the fourth planetary gear set RS4, directly axially adjacent this second planetary gear set RS2. In the illustrated example, the disk set of the clutch D has a comparatively small diameter, corresponding to the kinematic connection of the clutch D to the planet carrier ST2 of the second planetary gear set RS2. Of course, in a different embodiment of the transmission, the clutch D may be arranged at a larger diameter by a simple redesign, for example axially adjacent to the ring gear HO2 of the second planetary gear set RS2 or also axially between the first and third planetary gear sets RS1, RS3. A servo device of the clutch D, not illustrated for simplicity's sake, may be arranged such that it always rotates at the rotational speed of the planet carrier ST2 of the second planetary gear set RS2 or that it always rotates at the rotational speed of the planet carrier ST3 of the third planetary gear set RS3. The servo device of clutch D may, of course, also have dynamic pressure equalization to compensate for the rotatory pressure of the rotating pressure chamber.

FIG. 2 shows a shifting pattern of the multi-speed transmission according to FIG. 1 by way of example. In each gear, three shifting elements are engaged and two shifting elements are disengaged. In addition to the gear shift logic, the shifting pattern also shows values of the respective gear ratios i of the individual gears and the progressive ratios φ to be determined. The listed gear ratios i result from the (typical) stationary transmission ratios of the four planetary gear sets RS1, RS2, RS3, RS4 of negative 2.10, negative 1.60, negative 3.70 and negative 2.00. The shifting pattern also shows that double-shifts and/or range shifts are avoided when shifting sequentially because two adjoining gear steps jointly use one shifting element in the gear shift logic. It is preferable if the sixth gear is configured as a direct gear.

The first gear is obtained by engaging the brakes A and B and the clutch C, the second gear by engaging the brakes A and B and the clutch E, the third gear by engaging the brake B and the clutches C and E, the fourth gear by engaging the brake B and the clutches C and E, the fifth gear by engaging the brake B and the clutches C and D, the sixth gear by engaging the clutches C, D and E, the seventh gear by engaging the brake A and the clutches C and D and the eight gear, by engaging the brake A and the clutches D and E. As the shifting pattern further illustrates, the reverse gear is defined by engaging the brakes A and B and the clutch D.

According to the invention, it is possible to start driving the motor vehicle with a shifting element integrated in the transmission. A shifting element that is particularly suited is one that is required both in the first gear and in the reverse gear, in this case the brake A or the brake B. Advantageously, these two brakes A, B are also required in the second gear. If the brake B is used as the starting element integrated in the transmission, it is even possible to start driving in the first five gears and the reverse gear. As is apparent from the gear shift pattern, the clutch C can also be used to start driving in the forward direction, and the clutch D can be used as a transmission-internal starting element to start driving in the reverse direction.

The spatial arrangement of the shifting elements of the embodiment according to FIG. 1 of an inventive multi-speed transmission inside the transmission can, in principle, be arbitrary and is only limited by the dimensions and the outer contour of the transmission housing GG. Accordingly, FIG. 3 for instance shows two component configuration variants of the multi-speed transmission according to FIG. 1, wherein all kinematic couplings of the gear set elements, shifting elements and shafts are the same as in FIG. 1. The two component configuration variations according to FIG. 3 and FIG. 4 include the four planetary gear sets RS1 to RS4, which are now located in the axial direction in the order RS1, RS4, RS2, RS3 coaxially behind one another. The input shaft AN and output shaft AB are located coaxially as found in FIG. 1, so that now the first planetary gear set RS1 is the gear set of the transmission close to the input, while the third planetary gear set RS3, as in FIG. 1, is the gear set of the transmission close to the output. The statements made within the scope of the description of FIG. 1 with respect to the relative spatial position of the input and output shafts AN, AB and/or of the inputs and outputs of the transmission, can of course be applied to the embodiments of FIG. 3 and FIG. 4.

Figure 3:
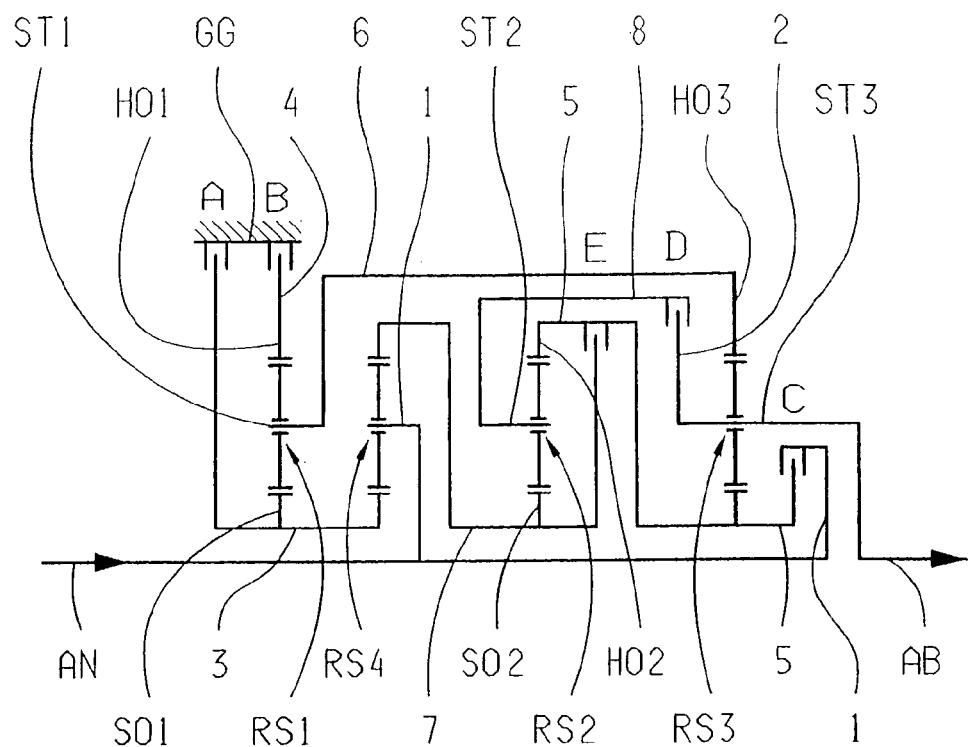
FIG. 3 is a first component configuration variant of the multi-speed transmission according to FIG. 1.
Figure 4:
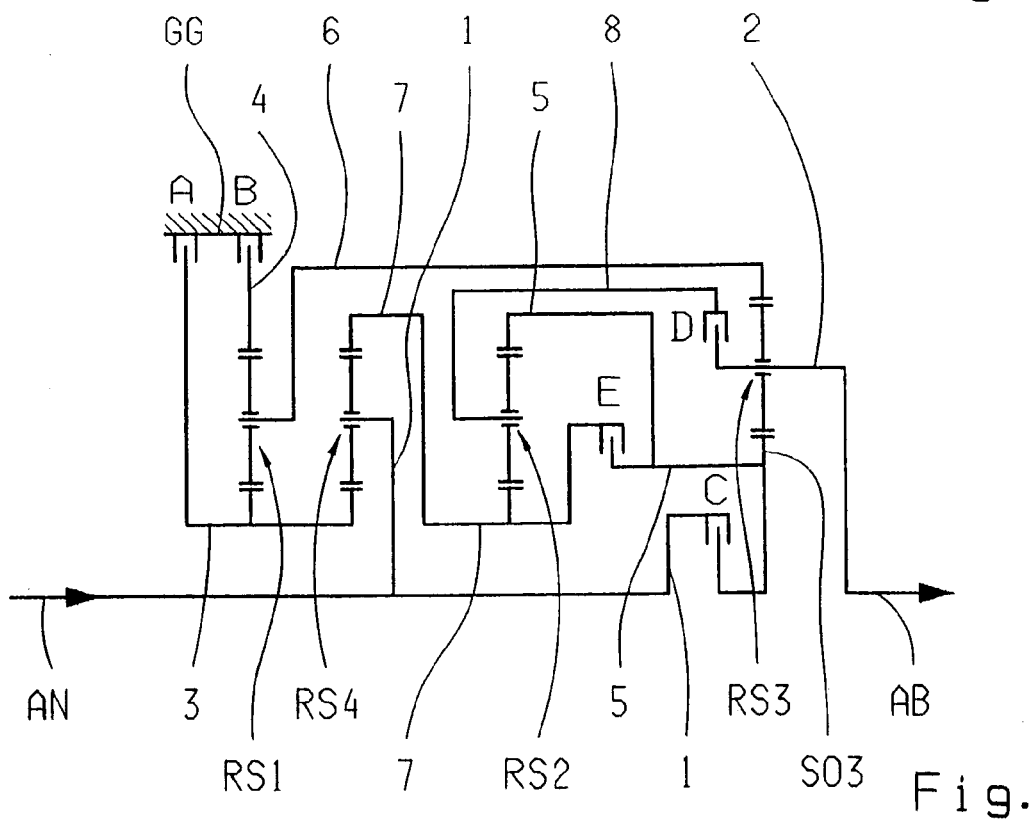
FIG. 4 is a second component configuration variant of the multi-speed transmission according to FIG. 1.

In accordance with the adapted spatial positions of the four planetary gear sets RS1 to RS4 of FIGS. 3 and 4, relative to one another compared to FIG. 1, an adapted spatial arrangement of the five shifting elements A to E, inside the transmission housing GG, relative to the gear sets, evolve compared to FIG. 1. In these two component configuration variations, the brake B, connected to the ring gear HO1 of the first planetary gear set RS1 or to the shaft 4, is expediently arranged at least partially in a region radially over the first planetary gear set RS1. The brake A connected to the sun gear SO1 of the first planetary gear set RS1 or to the shaft 3 is now located on the side of the first planetary gear set RS1 facing away from the fourth planetary gear set RS3 or facing away from the remaining gear sets, close to the input of the transmission. The disk sets of these two brakes have at least a similar diameter here. However, it is also easy to integrate the brake A into a housing wall of the transmission housing GG, with the wall being close to the input. To save axial installation length of the transmission, however, it may also be possible, according to a further embodiment, that the brake A is arranged at least partially in a region radially over the first planetary gear set RS1 and the brake B is arranged at least partially in a region radially over the fourth planetary gear set RS4, with the disk sets remaining unchanged axially adjacent to one another. In still another embodiment, it may also be provide, that the two brakes A, B are not located axially adjacent to, but radially on top of one another.

In the first component configuration variant of the multi-speed transmission according to FIG. 1, shown by way of example in FIG. 3, the disk sets of the two clutches D, E are now arranged in a region radially between the second and third planetary gear sets RS2, RS3, axially adjacent one another, in order to allow the disk sets of the two clutches D, E to be arranged on the largest possible diameter. The disk set of the clutch E is located closer to the second planetary gear set RS2 than the disk set of the clutch D. The shaft 8 of the transmission completely encompasses the second planetary gear set RS2 and the clutch E in the axial direction so that the clutch E is located inside a cylindrical space formed by the shaft 8, which is the mechanical linkage between the planet carrier ST2 of the second planetary gear set RS2 and the clutch D. Depending on the space available for installation of the transmission in the vehicle, it may however be expedient to provide the disk set of the clutch D substantially radially over the disk set of the clutch E. The shaft 6 of the transmission over the axial course thereof, extends completely across the fourth and second planetary gear sets RS4, RS2 as well as the two clutches E, D. The shaft 6 forming the mechanical linkage between the planet carrier ST1 of the first planetary gear set RS1 and the ring gear HO3 of the third planetary gear set RS3. In a further embodiment, from a spatial perspective, the clutch D may also be located axially between the second planetary gear set RS2 and the fourth planetary gear set RS4.

As is furthermore apparent from FIG. 3, the clutch C is now located on the side of the third planetary gear set RS3 facing away from the second planetary gear set RS2 or facing away from the remaining gear sets, directly axially adjacent third planetary gear set RS3. According to the application, as a transmission for a "standard drive" with coaxial input and output and the kinematics-induced coupling of the output shaft AB to the planet carrier ST3 of the third planetary gear set RS3, illustrated in FIG. 3, the diameter of the disk set of the brake C is comparatively small and the number of disks of the brake C required for reliably transmitting torque, is comparatively high. The resulting comparatively large axial extension of the clutch C, however, has no disadvantageous effect on a "standard drive" due to the common transmission tunnel contour of the vehicle. If the transmission, however, is supposed to be configured with an output axially parallel to the input, a large diameter is made available due to the necessary routing of the output shaft for providing the clutch C in the area between the output spur gear connected to the planet carrier ST3 and the outer housing wall.

In accordance with the spatial configuration of the four gear sets viewed in the axial direction in the sequential order of "RS1, RS4, RS2, RS3", no more than one shaft extends centrally through the four planetary gear sets RS1 to RS4 in the axial direction, and according to FIG. 3, that shaft is the input shaft AN or the shaft 1 of the transmission. This is particularly advantageous, on the one hand, for dimensioning the input shaft AN and the gear sets and, on the other hand, for a comparatively simple lubricant supply to the planet gears of the four planetary gear sets RS1, RS2, RS3, RS4 and for a comparatively simple supply of pressurants and lubricants to the clutches E, D, C. In the embodiment, with a coaxial configuration of the input and output shafts AN, AB according to FIG. 3, the input shaft AN or the shaft 1 of the transmission extends through all four planetary gear sets RS1 to RS4 and over it's axial length it extends centrally through the third shaft 3, the seventh shaft 7 and the fifth shaft 5. Differing from FIG. 3, a further embodiment, with non-coaxial input and output shafts has, the input of the transmission located close to the third planetary gear set RS3 or close to the clutch D, and the shaft 3 may also be rotatably mounted directly on a correspondingly configured hub, which is rigidly fixed to the housing of the outer housing wall opposite from the input. The input shaft AN or the shaft 1 will then completely extend centrally only through the two planetary gear sets RS3 and RS2 (and the clutches C, D, E) in the axial direction.

The second component configuration variant of the multi-speed transmission according to FIG. 1 as shown in FIG. 4, differs from the embodiment described above according to FIG. 3 particularly due to a modified design of the clutch E and the spatial configuration of the clutch C.

As is apparent from FIG. 4, from a spatial perspective, the clutch E is located axially between the second and third planetary gear sets RS2, RS3 and axially directly adjacent the second planetary gear set RS2, similar to FIG. 3. While in FIG. 3 the exterior disk carrier of the clutch E is non-rotatably connected to the shaft 5 (or to the ring gear HO2 of the second planetary gear set RS2) and the interior disk carrier of the clutch E is non-rotatably connected to the shaft 7 (or to the sun gear SO2 of the second planetary gear set RS2). In FIG. 4 the exterior disk carrier of the clutch E is now non-rotatably connected to the shaft 7 and the interior disk carrier of the clutch E is connected accordingly to the shaft 5. This design configuration is advantageous if the servo device—not shown in detail—of the clutch E is supposed to be positioned on the side of the associated disk set of the clutch E facing the planetary gear set RS2 and will always rotate at the rotational speed of the seventh shaft 7. The design embodiment of the clutch E, illustrated in FIG. 4, can of course be altered to the example according to FIG. 3.

As is furthermore apparent from FIG. 4, from a spatial perspective the clutch C is now located axially between the second and third planetary gear sets RS2, RS3 and axially directly adjacent the third planetary gear set RS3, unlike in FIG. 3. The configuration of this clutch C on a comparatively small diameter in the area close to the sun gear SO3 of the third planetary gear set RS3, shown according to FIG. 4, is of course only provided by way of example; in a modified embodiment, the clutch C may also be arranged on a larger diameter.

In accordance with the spatial configuration of the four gear sets when viewed in the axial direction in the sequential order of "RS1, RS4, RS2, RS3", as is shown in the embodiment in FIG. 4, no more than one shaft of the transmission passes centrally through the four planetary gear sets RS1 to RS4 in the axial direction. The planetary gear sets RS1, RS4 and RS4 are passed through the input shaft AN or the shaft 1, and the planetary gear set RS3 is passed through at a maximum by a section of the fifth shaft 5.

Further embodiments for an inventive multi-speed transmission will be described with reference to the following figures and can all be operated with the same gear shift logic as in FIG. 2.

Figure 5:
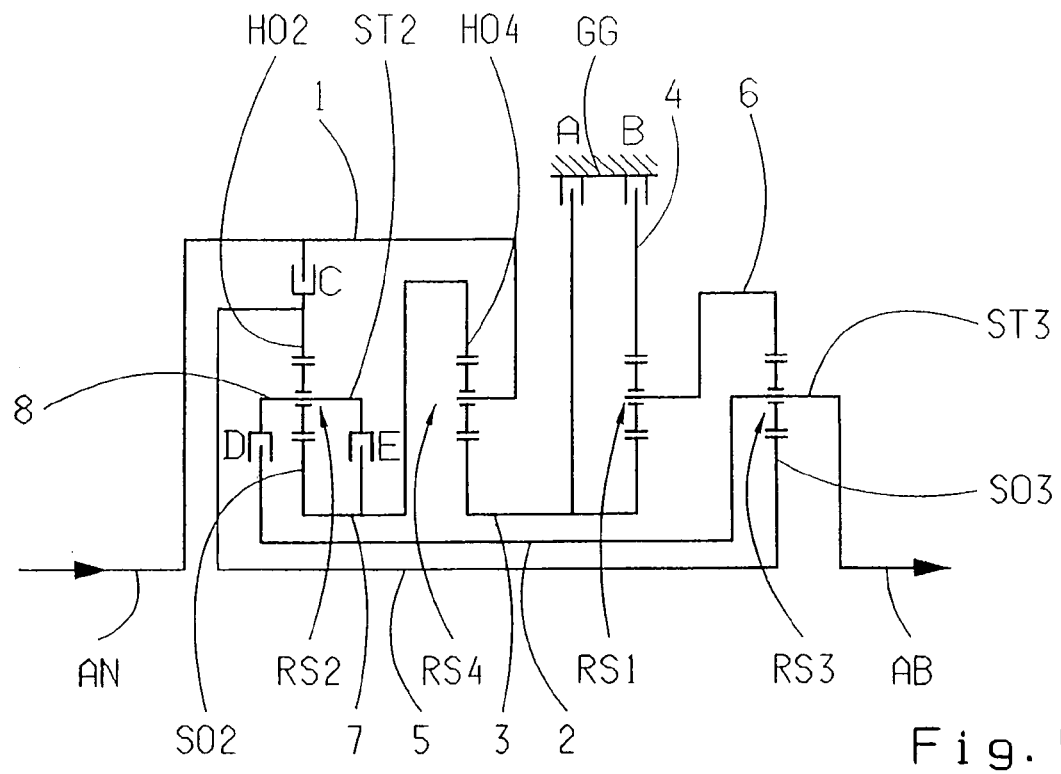
FIG. 5 is a schematic illustration of a second embodiment of a multi-speed transmission according to the invention.

FIG. 5 is a schematic illustration of a second embodiment of an inventive multi-speed transmission, based on the first embodiment according to FIG. 1 described above in detail. As is easily apparent from FIG. 5, the transmission structure and the kinematic couplings of the four planetary gear sets RS1, RS2, RS3, RS4 and of the five shifting elements A, B, C, D, E with each other and to the input and output shafts AN, AB, are almost entirely the same as those of FIG. 1. The significant difference from FIG. 1 is only the kinematic coupling of the fifth shifting element E to the gear set elements. According to FIG. 5, it is provided that the clutch E is now located in the power flow between the seventh shaft 7 and the eighth shaft 8 of the transmission. Unlike in FIG. 1, this means that the coupling shaft 7, provided between the sun gear SO2 of the second planetary gear set RS2 and the ring gear HO4 of the fourth planetary gear set RS4, can be connected to the planet carrier ST2 of the second planetary gear set RS2 via the clutch E.

Accordingly, with respect to spatial arrangement, the clutch E, as is provided in FIG. 5, from an axial perspective, is located between the two aforementioned planetary gear sets RS2 and RS4. The spatial arrangement of the clutch C should therefore be regarded as completely separated from the spatial arrangement of the clutch E. In FIG. 5, this clutch C is arranged, by way of example, in a region radially over the second planetary gear set RS2. A servo device, not shown, of the clutch E may expediently be mounted axially displaceably on the shaft 7 and will always rotate at the rotational speed of this shaft 7. A servo device of the clutch C, which is likewise not shown, may expediently be mounted axially displaceable on the shaft 1 or the input shaft AN and to always rotates at rotational speed of the input shaft.

Figure 6:
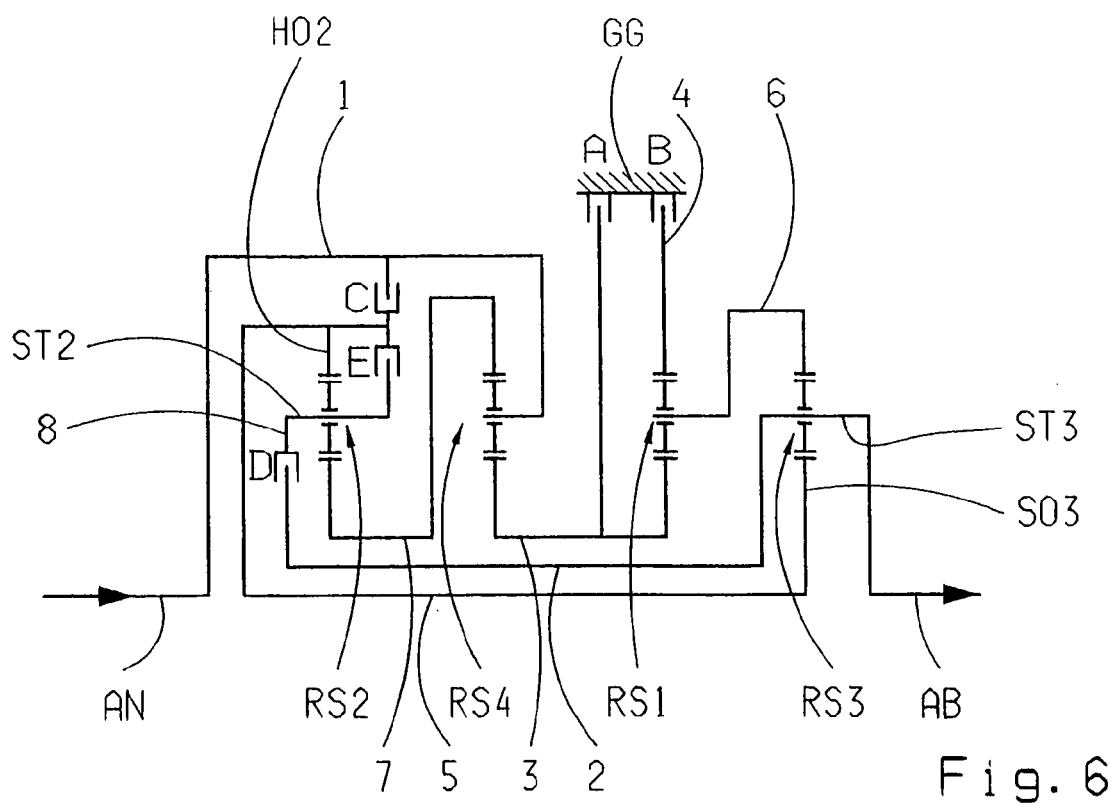
FIG. 6 is a schematic illustration of a third embodiment of a multi-speed transmission according to the invention.

FIG. 6 is a schematic illustration of a third embodiment of an inventive multi-speed transmission, also based on the first embodiment according to FIG. 1 described above in detail. As is easily apparent from FIG. 6, the transmission structure and the kinematic couplings of the four planetary gear sets RS1, RS2, RS3, RS4 and of the five shifting elements A, B, C, D, E with each other and to the input and output shafts AN, AB are almost entirely the same as those of FIG. 1. The significant different from FIG. 1 is again only the kinematic coupling of the fifth shifting element E to the gear set elements. According to FIG. 6, the clutch E is now located in the power flow between the fifth shaft 5 and the eighth shaft 8 of the transmission. Unlike FIG. 1, the planet carrier ST2 and ring gear HO2 of the second planetary gear set RS2 can be connected to one another via the clutch E.

Figure 7:
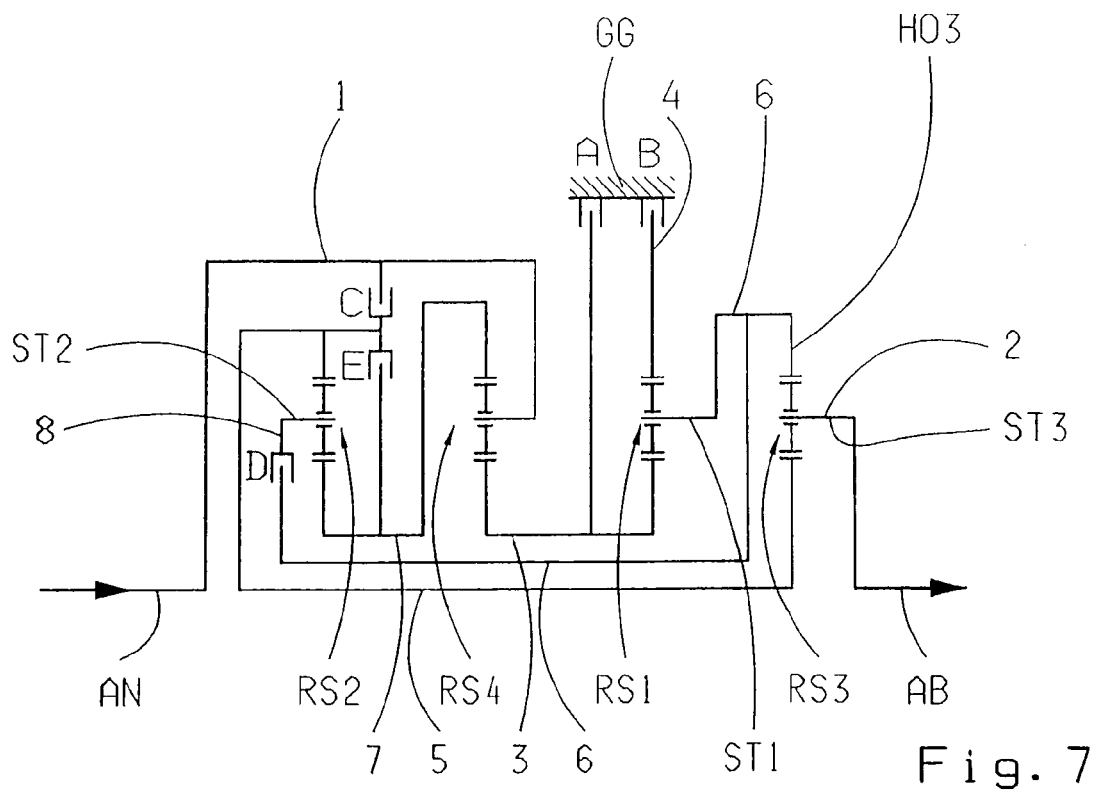
FIG. 7 is a schematic illustration of a fourth embodiment of a multi-speed transmission according to the invention.

FIG. 7 is a schematic illustration of a fourth embodiment of an inventive multi-speed transmission, likewise based on the first embodiment according to FIG. 1 described above in detail. As is easily apparent from FIG. 7, the transmission structure and the kinematic couplings of the four planetary gear sets RS1, RS2, RS3, RS4 and of the five shifting elements A, B, C, D, E with each other and to the input and output shafts AN, AB are almost entirely the same as those of FIG. 1. The significant difference from FIG. 1 here is the kinematic coupling of the fourth shifting element D. According to FIG. 7, the clutch D is located in the power flow between the eighth shaft 8 and the sixth shaft 6 of the transmission. Unlike FIG. 1, this means that the coupling shaft 6 provided between the planet carrier ST1 of the first planetary gear set RS21 and the ring gear HO3 of the third planetary gear set RS3 can be connected to the planet carrier ST2 of the second planetary gear set RS2 via the clutch D.

As a result of this connection of the clutch D, unlike FIG. 1, the sixth shaft 6 extends in some areas centrally inside the third shaft 3 and in some areas centrally inside the seventh shaft 7, wherein the fifth shaft 5 runs centrally in sections inside this sixth shaft 6. As in FIG. 1, another section of the fifth shaft 5 completely encompasses the clutch D and the second planetary gear set RS2 in the axial and radial directions. As in FIG. 1, the first shaft 1 completely encompasses the second and fourth planetary gear sets RS2, RS4 as well as the clutches D, C, E in the axial and radial directions.

Figure 8:
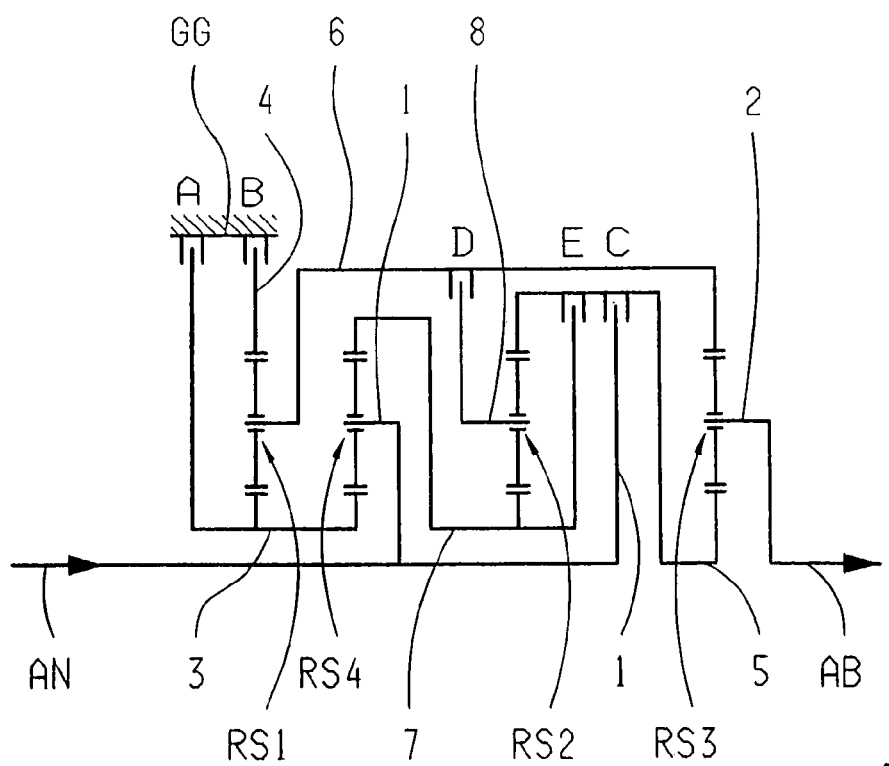
FIG. 8 is a component configuration variant of the multi-speed transmission according to FIG. 7.

As mentioned above, the spatial arrangement of the shifting elements of the illustrated embodiments of the inventive multi-speed transmission inside the transmission is, in principle, arbitrary and only limited by the dimensions and the outer contour of the transmission housing GG. Accordingly, FIG. 8 shows a configuration variant of the multi-speed transmission according to FIG. 7, with all the kinematic couplings of the gear set elements, shifting elements and shafts being the same as those of FIG. 7. Similar to the component configuration variants described above with reference to FIGS. 3 and 4, the component configuration variant shown in FIG. 8, due to the slender housing structure, is suited particularly well for installation in a vehicle with a "standard drive".

As is apparent from FIG. 8, the four planetary gear sets RS1 to RS4 are now located coaxially behind one another in the axial direction and in the sequential order of RS1, RS4, RS2, RS3, similar to FIGS. 3 and 4. The input shaft AN and output shaft AB remain coaxial to one another such that the third planetary gear set RS3 remains the gear set of the transmission close to the output, however the first planetary gear set RS1 is now the gear set of the transmission close to the input. The statements made within the scope of the description of the above examples with respect to the possibilities, the relative spatial position of the input and output shafts AN, AB and/or of the input and output of the transmission, can of course be applied accordingly to the embodiment according to FIG. 8.

In accordance with the changed spatial position of the four planetary gear sets RS1 to RS4 relative to one another as compared to FIG. 7, according to FIG. 8 the expedient spatial arrangement of the five shifting elements A to E inside the transmission housing GG relative to the gear sets is changed. The part of the transmission close to the input, comprising two brakes A and B and the two planetary gear sets RS1 and RS4, is identical to that of FIG. 3 such that further description of the proposed spatial arrangement and configuration variants of these components is not necessary at this point. As is apparent from FIG. 8, from a spatial perspective, the clutch D is now located in a region axially between the planetary gear sets RS4 and RS2, while axially directly adjacent the second planetary gear set RS2. The two clutches E and C are now located axially between the two planetary gear sets RS2 and RS3, here by way of example, substantially axially adjacent to each other. The clutch E axially directly abuts the second planetary gear set RS2, which is to say that the clutch C is configured closer to the planetary gear set RS3 than the clutch E. In another embodiment of the transmission, it may of course be provided that the two clutches E and C located axially between the planetary gear sets RS2 and RS3, from a radial point view, are arranged substantially on top of each other.

Unlike in FIG. 3, the sixth shaft 6 of the transmission, according to FIG. 8, in the axial extent thereof completely encompasses the fourth planetary gear set RS4, the clutch D, the second planetary gear set RS2, the clutch E and now also the clutch C in the axial direction.

A servo device, which for simplicity's sake is not shown in detail in FIG. 8, of the clutch D may be located, at least substantially axially between the two planetary gear sets RS1 and RS4 and can be mounted axially displaceably on the planet carrier ST1 of the first planetary gear set RS1. As such an operating element of this servo device acting on the disk set of the clutch D extends across the fourth planetary gear set RS4 in the axial direction and the associated disk set extends axially in the direction of the second planetary gear set RS2 when closing the clutch D. To ensure a simple pressurant and lubricant supply to the servo device of the clutch D, it may also be provided, that this servo device of the clutch D is located at least substantially directly adjacent the third planetary gear set RS3 on the side thereof facing the planetary gear set RS2 and is mounted axially displaceably on the sun gear SO3 of the third planetary gear set RS3 or on the fifth shaft 5. In this case, an operating element of this servo device acting on the disk set of the clutch D extends across the two clutches C and E as well as the second planetary gear set RS2 in the axial direction and actuates the associated disk set axially in the direction of the fourth planetary gear set RS4 when closing the clutch D.

A servo device of the clutch C, which is likewise not shown in FIG. 8 for simplicity's sake, may be mounted, axially displaceably on the input shaft AN or on the shaft 1 using a comparatively simple design and may optionally be located in a region axially between the two adjoining disk sets of the clutches C and E or on the side of the disk set of clutch C facing away from the clutch E. A servo device of clutch E, which is not shown in FIG. 8, may be positioned axially displaceably on the shaft 7 and may be located in a region axially between the two adjoining disk sets of the clutches C, E or axially between the disk set of the clutch E and the second planetary gear set RS2.

Figure 9:
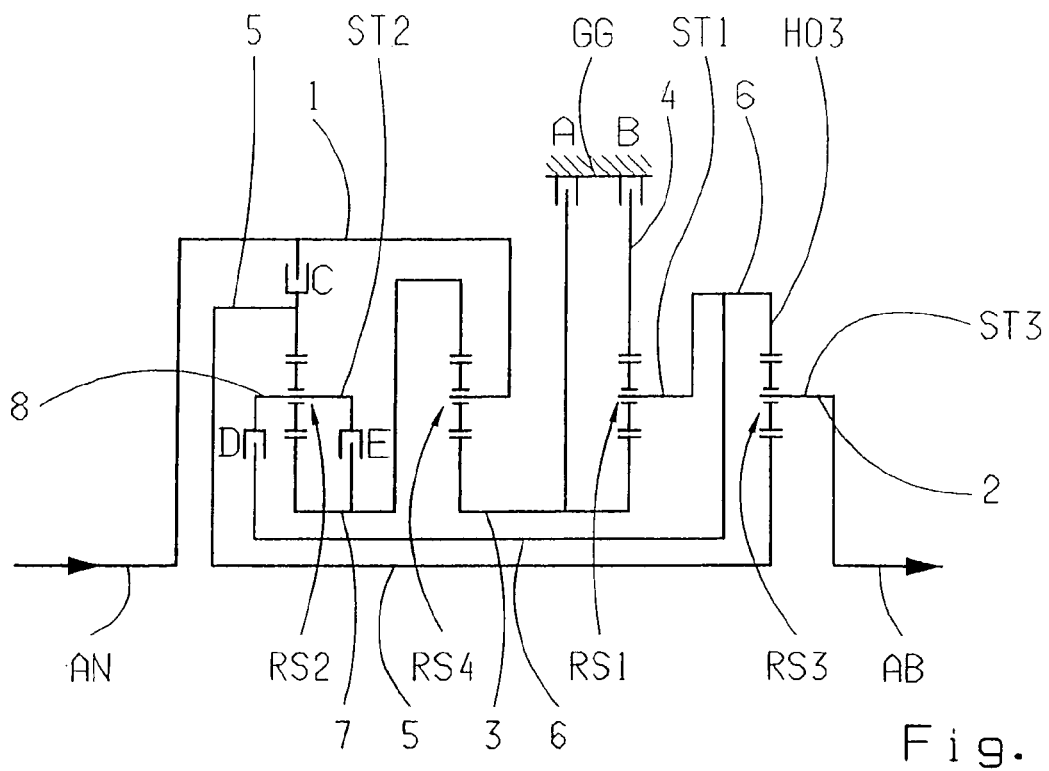
FIG. 9 is a schematic illustration of a fifth embodiment of a multi-speed transmission according to the invention.

FIG. 9 is a schematic illustration of a fifth embodiment of an inventive multi-speed transmission, based on the fourth example of FIG. 7 described above in detail. As is easily apparent from FIG. 9, the transmission structure and the kinematic couplings of the four planetary gear sets RS1, RS2, RS3, RS4 and of the five shifting elements A, B, C, D, E with each other and to the input and output shafts AN, AB are almost entirely the same as those of FIG. 7. The significant difference from FIG. 7 is only the kinematic coupling of the fifth shifting element E to the gear set elements. According to FIG. 9, the clutch E is now located in the power flow between the seventh shaft 7 and the eighth shaft 8 of the transmission. Unlike FIG. 7, this means that the coupling shaft 7, provided between the sun gear SO2 of the second planetary gear set RS2 and the ring gear HO4 of the fourth planetary gear set RS4, can be connected to the planet carrier ST2 of the second planetary gear set RS2, via the clutch E. The kinematic connection of the clutch E to the gear set elements is therefore identical to those of FIGS. 5 and 9.

Figure 10:
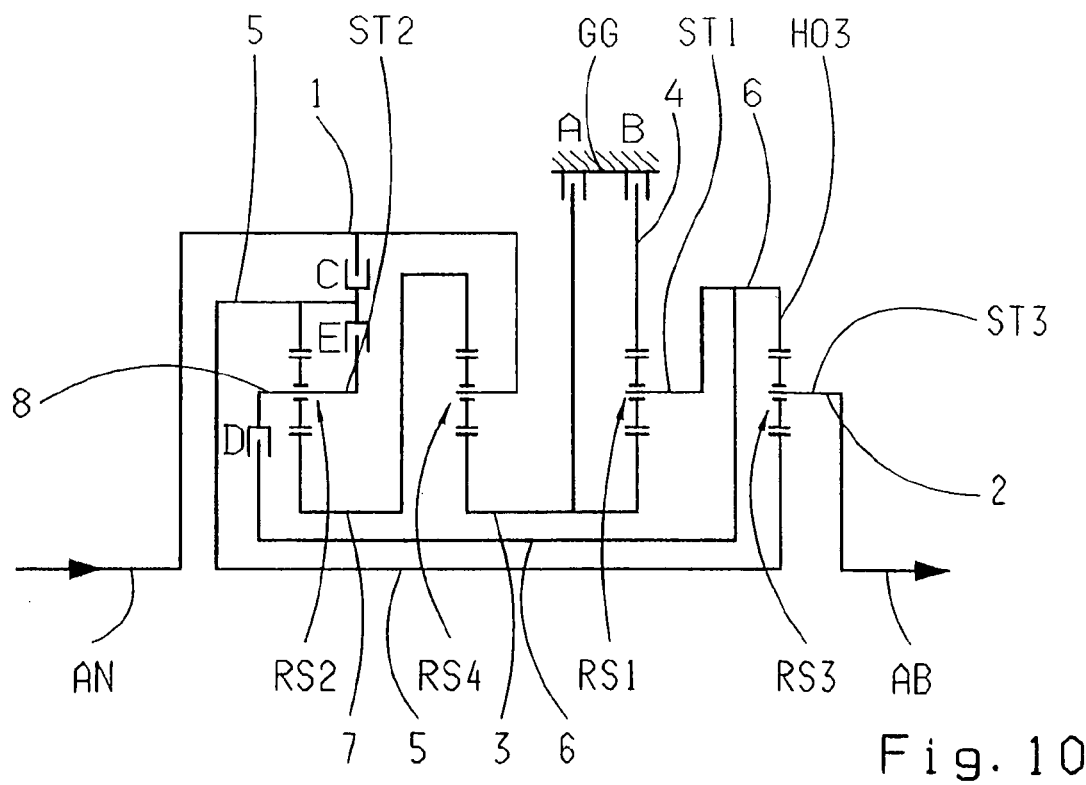
FIG. 10 is a schematic illustration of a sixth embodiment of a multi-speed transmission according to the invention.

FIG. 10 is a schematic illustration of a sixth embodiment of an inventive multi-speed transmission, based on the fourth example of FIG. 7 described above. As is easily apparent from FIG. 10, the transmission structure and the kinematic connections of the four planetary gear sets RS1, RS2, RS3, RS4 and of the five shifting elements A, B, C, D, E with each other and to the input and output shafts AN, AB are almost entirely the same as those of FIG. 7. The significant difference from FIG. 7 is the kinematic coupling of the fifth shifting element E to the gear set elements. According to FIG. 10, the clutch E is now located in the power flow between the fifth shaft 5 and the eighth shaft 8 of the transmission. Unlike FIG. 7, the planet carrier ST2 and ring gear HO2 of the second planetary gear set RS2 can be connected to one another, via the clutch E. The kinematic connection of the clutch E to the gear set elements is therefore identical to those of FIGS. 6 and 10.

The three configuration variations for the multi-speed transmission according to FIG. 4 will be explained in more detail hereinafter with reference to FIGS. 11, 12 and 13, wherein expedient configurations of servo devices for operating the respective disk sets of the five shifting elements are drawn in schematically simplified illustrations. All servo devices may comprise, in the known manner, a piston acting on the disk set or friction element of the respective shifting element, a pressure chamber that can be filled with a pressurant associated with the piston as well as a piston return element configured as a disk spring, spring pack or hydraulic chamber. The servo devices of the clutches may additionally have, in the known manner, dynamic pressure equalization with a pressure equalization chamber that can be filled with unpressurized lubricant for acting on the piston to compensate for the rotatory pressure of the rotating pressure chamber. In all three embodiments, the input shaft AN is connected to a known torque converter, which here, by way of example, forms the starting element of the transmission and is accordingly connected to a driving motor of the motor vehicle, which is not shown in detail.

Figure 11:
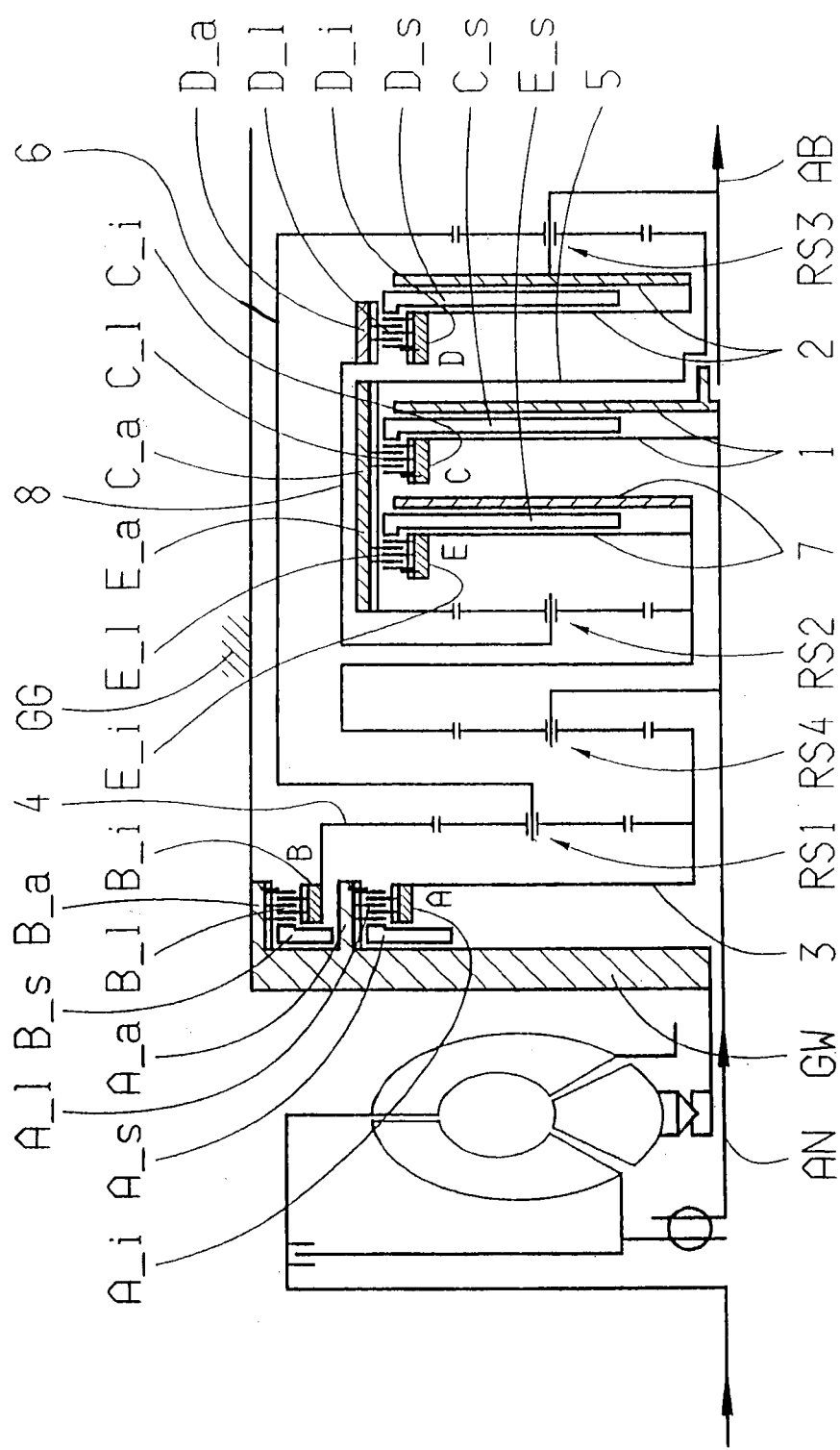
FIG. 11 is a first configuration variant of the multi-speed transmission according to FIG. 4.

Compared to FIG. 4, the essential differences from the first configuration variant of the multi-speed transmission according to FIG. 4, shown in FIG. 11 relate to the spatial arrangement of the adjoining shifting elements A, B, adjacent the first planetary gear set RS1 and the spatial arrangement of the shifting element C in the area axially between the second and third planetary gear sets RS2, RS3.

As is apparent from FIG. 11, the two brakes A and B—like FIG. 4—are located on the side of the first planetary gear set RS1 facing away from the fourth planetary gear set RS4. However, unlike FIG. 4, they are now at least substantially radially located on top of each other, when viewed in the axial direction. The disk set of the brake B, identified as B_l, is arranged at least substantially radially over the disk set of the brake A, which is identified by A_l, and the servo device B_S of the brake B, which is associated with the disk set B_l, and is arranged at least substantially radially over the servo device A_s of the brake A, which is associated with the disk set A_l. Both servo devices A_s, B_s are provided on the side of the respectively associated disk set A_l, B_l opposite of the first planetary gear set RS1 and actuate the respectively associated disk set A_l, B_l axially in the direction of the planetary gear set RS1 during engagement. As a result, the disk sets A_l, B_l of the two brakes A, B are adjacent the first planetary gear set RS1 when viewed in the axial direction. An interior disk carrier A_i of the brake A receive the internally toothed disks of the disk set A_l, which are configured as lining disks, forms a section of the third shaft 3 of the transmission and is permanently connected to the sun gears of the first and fourth planetary gear sets RS1, RS4 in accordance with the gear set pattern. An interior disk carrier B_i of the brake B, receives internally toothed disks of the disk set B_l, which are configured as lining disks, forms a section of the fourth shaft 4 of the transmission and is permanently connected to the ring gear of the first planetary gear set RS1 in accordance with the gear set pattern. An exterior disk carrier A_a of the brake A, receives externally toothed disks of the disk set A_l, which are configured as steel disks, and an exterior disk carrier B_a of the brake B receives externally toothed disks of the disk set B_l, which are configured as steel disks, are both integrated in a housing wall GW, which is non-rotatably connected to the transmission housing GG. The two servo devices A_s, B_s are also integrated into this housing wall GW or are mounted axially displaceably on this housing wall GW, whereby the pressurant supply to these two servo devices A_s, B_s may have an accordingly simple design. In another embodiment, the exterior disk carriers A_a and/or B_a may, of course, also be configured as separate components, which are then connected non-rotatably to the transmission housing GG, via suitable means.

It is furthermore apparent from FIG. 11 that the three clutches C, D and E—like FIG. 4—are all provided in a region axially between the second and third planetary gear sets RS2, RS3. Unlike FIG. 4, the clutch C here is located axially between the two clutches E and D, wherein the clutch E is axially directly adjacent the second planetary gear set RS2 and clutch D is axially directly adjacent the third planetary gear set RS3. By way of example, the disk sets of the clutches C, D and E identified with C_l, D_l, E_l may all be arranged on the same diameter to enable a concept having identical parts. An interior disk carrier C_i of the clutch C receives internally toothed disks of the disk set C_l, which are configured as steel disks, forms a section of the first shaft 1 of the transmission and is permanently connected to the input shaft AN of the transmission in accordance with the gear set pattern. An interior disk carrier D_l of the clutch D receives internally toothed disks of the disk set D_l, which are configured as lining disks, forms a section of the second shaft 2 of the transmission and is permanently connected to the planet carrier of the third planetary gear set RS3 and the output shaft AB of the transmission, in accordance with the gear set pattern. An interior disk carrier E_i of the clutch E receives internally toothed disks of the disk set E_l, which are configured as steel disks, forms a section of the seventh shaft 7 of the transmission and is permanently connected to the sun gear of the second planetary gear set RS2 and the ring gear of the fourth planetary gear set RS4 in accordance with the gear set pattern. An exterior disk carrier C_a of the clutch C receives externally toothed disks of the disk set C_l, which are preferably configured as lining disks, and an exterior disk carrier E_a of the clutch E receives externally toothed disks of the disk set E_l, which are preferably configured as lining disks, are configured in one piece as a common component, and form a section of the fifth shaft 5 of the transmission as well as being permanently connected to the ring gear of the second planetary gear set RS2 and the sun gear of the third planetary gear set RS3, in accordance with the gear set pattern. An exterior disk carrier D_a of the clutch D receives externally toothed disks of the disk set D_l, which are preferably configured as steel disks, forms a section of the eighth shaft 8 of the transmission and is permanently connected to the planet carrier of the second planetary gear set RS2 in accordance with the gear set pattern.

The servo device C_s of the clutch C is associated with the disk set C_l, and is located on the side of the disk set C_l opposite from the second planetary gear set RS2, and is mounted axially displaced on the interior disk carrier C_i, to always rotate at the rotational speed of the shaft 1 or the input shaft AN and actuates the disk set C_l axially in the direction of the planetary gear set RS2 during engagement. Pressurants and lubricants can be supplied to the servo device C_s from the input shaft AN in a comparatively simple design via corresponding ducts. The servo device D_s of the clutch C is associated with the disk set D_l, is located on the side of the disk set D_l opposite from the second planetary gear set RS2, and is mounted axially displaceably on the interior disk carrier D_i, to always rotate at the rotational speed of the shaft 2 or the output shaft AB and actuates the disk set D_l axially in the direction of the planetary gear set RS2 during engagement. Pressurants and lubricants can be supplied to the servo device D_s from the output shaft AB, via corresponding ducts, by means of a section of the shaft 5, the section being rotatably mounted on the output shaft AB and configured as a sun shaft of the planetary gear set RS 3, and by means of a hub section of the interior disk carrier D_i, which is rotatably mounted on the aforementioned sun shaft. The servo device E_s of the clutch E is associated with the disk set E_l, is located on the side of the disk set E_l opposite the second planetary gear set RS2, and is mounted axially displaced on the interior disk carrier E_i, to always rotate at the rotational speed of the shaft 7 and actuates the disk set E_l likewise axially in the direction of the planetary gear set RS2 during engagement. Pressurants and lubricants can be supplied to the servo device E_s from the input shaft AN, via corresponding ducts, by means of a hub section of the interior disk carrier E_i, which is rotatably mounted on the input shaft AN. As is apparent from FIG. 11, the servo devices C_s, D_s and E_s may have at least partially identical designs to enable the use of identical parts.

Figure 12:
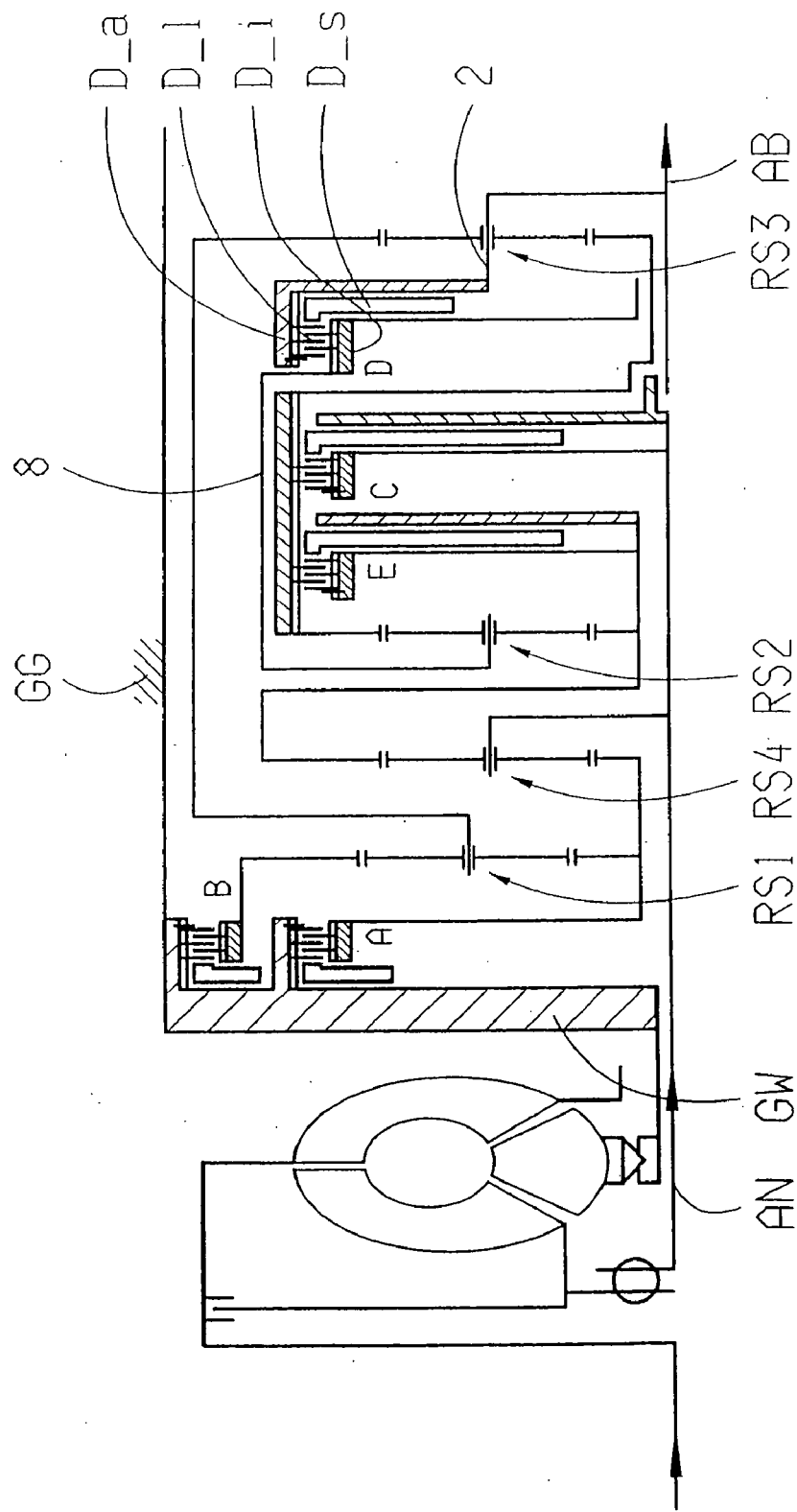
FIG. 12 is a second configuration variant of the multi-speed transmission according to FIG. 4.

The second configuration variant of the multi-speed transmission according to FIG. 4 is shown schematically in FIG. 12, and is based on the first configuration variant described above in reference to FIG. 11. The differences from that of FIG. 11 relate only to the design configuration of the clutch D. As is easily apparent from FIG. 12, the remaining transmission elements are the same as those of FIG. 11, and as such, further description not needed at this point. Unlike FIG. 11, the interior disk carrier D_l of the clutch D forms a section of the eighth shaft 8 of the transmission and is permanently connected to the planet carrier of the second planetary gear set RS2 in accordance with the gear set pattern. Unlike FIG. 11, the exterior disk carrier D_a of the clutch D, forms a section of the second shaft 2 of the transmission and is permanently connected to the planet carrier of the third planetary gear set RS3 and to the output shaft AB of the transmission in accordance with the gear set pattern. The exterior disk carrier D_a forms a cylindrical space, inside which both the disk set D_l of the clutch D and the servo device D_s for actuating the disk set D_l, are arranged. The servo device D_s of the clutch D is mounted axially displaceably on the exterior disk carrier D_a, however like FIG. 11 it always rotates at the rotational speed of the shaft 2 or of the output shaft AB and actuates the disk set D_l axially in the direction of the planetary gear set RS2 during engagement, just like FIG. 11. As apparent from FIG. 12, a comparatively simple design of the exterior disk carrier D_a of the clutch D and the planet carrier or carrier of the third planetary gear set RS3 can be implemented such that the exterior disk carrier D_a and the carrier plate, which face the clutch D, of the carrier or planet carrier of the third planetary gear set RS3 are configured as one piece. Pressurants and lubricants can be supplied to the servo device D_s from the output shaft AB via corresponding ducts by means of the planet carrier of the third planetary gear set RS3, or from the output shaft AB via corresponding ducts, by means of a sun shaft of the planetary gear set RS3, the shaft being rotatably mounted on the input shaft AB, and a hub of the exterior disk carrier D_a, the hub being rotatably mounted on the aforementioned sun shaft (not shown in detail in FIG. 12).

Figure 13:
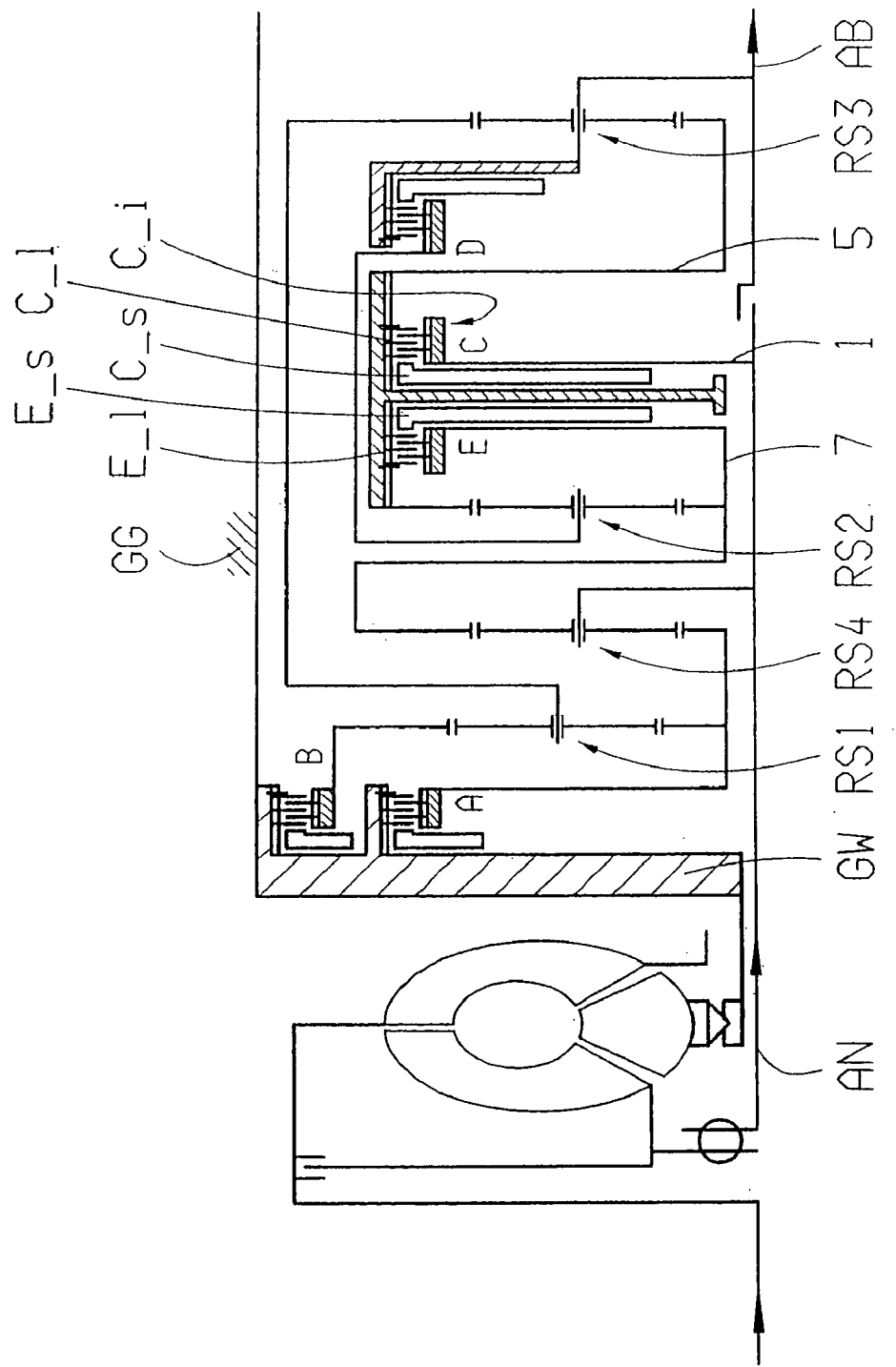
FIG. 13 is a third configuration variant of the multi-speed transmission according to FIG. 4.

The third configuration variant of the multi-speed transmission according to FIG. 4 is shown schematically in FIG. 13 and is based on the second configuration variant described above with reference to FIG. 12. The differences compared to FIG. 12 relate to the design configuration of the assembly with the two clutches C and E. As is easily apparent from FIG. 13, the remaining transmission elements are the same as those of FIG. 12.

Comparable to FIG. 12, a common exterior disk carrier (C_a, E_a) is provided for the clutches C, E, and forms a section of the shaft 5 of the transmission and permanently connects it to the ring gear of the second planetary gear set RS2 and the sun gear of the third planetary gear set RS3, in accordance with the gear set pattern. Similar to FIG. 12, the interior disk carrier C_i of the clutch C forms a section of the shaft 1 of the transmission and is permanently connected to the input shaft AN. Similar to FIG. 12, the interior disk carrier E_i of the clutch E forms a section of the shaft 7 of the transmission and is permanently connected to the sun gear of the second planetary gear set RS2 and the ring gear of the fourth planetary gear set RS4.

Starting with the intent of creating a sub-assembly that is easy to produce and comprises two disk sets and a common disk carrier as well as two servo devices associated with these disk sets, the common exterior disk carrier C_a, E_a of the clutches C, E now has a radially inwardly directed intermediate wall in the region axially between the two disk sets C_l, E_l of the clutches C, E. The servo device C_s of the clutch C is located axially between the aforementioned intermediate wall and the disk set C_l, which is to say, axially directly adjacent the aforementioned intermediate wall on the side, facing the third planetary gear set RS3. The servo device E_s of the clutch E is located axially between the aforementioned intermediate wall and the disk set E_l, which is to say, axially directly adjacent the aforementioned intermediate wall on the side, facing the second planetary gear set RS2. In this way, the section of the common exterior disk carrier of the clutches C, E, associated with the exterior disk carrier C_a, on the side of the aforementioned intermediate wall facing the third planetary gear set RS3, forms a cylindrical space, inside which the servo device C_s and the disk set C_l of the clutch C are provided. Furthermore, the section of the common exterior disk carrier of the clutches C, E, associated with the exterior disk carrier E_a, on the side of the aforementioned intermediate wall facing the second planetary gear set RS2 forms a cylindrical space, inside which the servo device E_s and the disk set E_l of the clutch E are provided. Unlike FIG. 12, both servo devices C_s, E_s are mounted axially displaceably on the common exterior disk carrier of the clutches C and E, and are separated from one another by the aforementioned intermediate wall of the common exterior disk carrier and always rotate at the rotational speed of the shaft 5 of the transmission. Unlike FIG. 12, the movement of the two servo devices C_s, E_s are opposite from each other when engages the respective clutch C or E. Pressurants and lubricants can be supplied to the servo devices C_s, E_s from the input shaft AN, via corresponding ducts in a comparatively simple design, by means of a hub of the common exterior disk carrier, with the hub being rotatably mounted on the input shaft AN.

Two configuration variations for the multi-speed transmission according to FIG. 8 will be explained in more detail hereinafter with reference to FIGS. 14 and 15, wherein these two figures configurations of servo devices for operating the respective disk sets of the five shifting elements, are drawn in schematically simplified illustrations. The statements made within the scope of the description of FIGS. 11 to 14 with respect to the configuration of the servo devices and of course similar to those of FIGS. 14 and 15.

Figure 14:
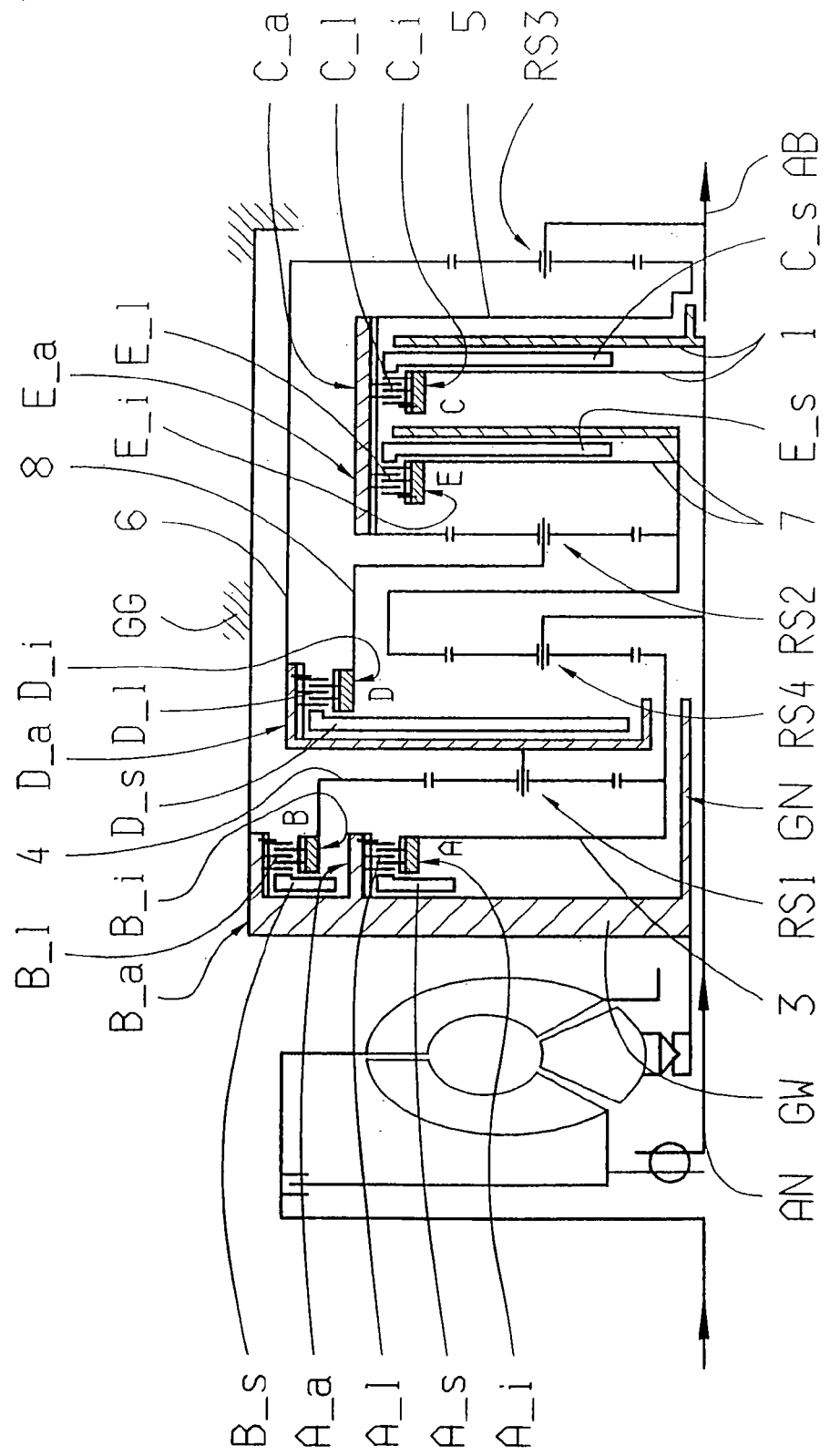
FIG. 14 is a first configuration variant of the multi-speed transmission according to FIG. 8.

Compared to FIG. 8, the essential differences of the first configuration variant of the multi-speed transmission according to FIG. 8 as shown in FIG. 14, relate to the spatial arrangement of the adjoining shifting elements A, B abutting the first planetary gear set RS1 as well as to the spatial arrangement of the shifting element C adjacent the fourth planetary gear set RS4.

As is apparent from FIG. 14, the two brakes A and B—like FIG. 8—are located on the side of the first planetary gear set RS1 facing away from the fourth planetary gear set RS4, however unlike FIG. 8, they are now provided at least substantially radially on top of each other when viewed in the axial direction. The configuration or design embodiment of these two brakes A, B is the same as those of FIG. 11. As in FIG. 11, the disk set of the radially inner brake A in FIG. 14 is also identified with A_l, the exterior disk carrier of the brake A is identified with A_a, the carrier by way of example is integrated in the housing wall GW rigidly fixed to the transmission housing, with the interior disk carrier A_i of the brake A, the carrier is connected to the sun gears of the planetary gear sets RS1 and RS4, and the servo device A_s of the brake A, mounted axially displaceably on the housing wall GW (or on the exterior disk carrier A_a). As in FIG. 11, the disk set of the radially outer brake B in FIG. 14 is also identified with B_l, the exterior disk carrier of the brake B is identified with B_a, the carrier being integrated in the housing wall GW is rigidly fixed to the transmission housing, the interior disk carrier B_i of the brake B is connected to the ring gear of the planetary gear set RS1, and the servo device B_s of the brake B is mounted axially displaceably on the housing wall GW (or on the exterior disk carrier B_a). Both servo devices A_s, B_s are therefore provided in the area of the outer wall (GW) of the transmission facing the driving motor, which is not shown in detail, which is to say that both disk sets A_l, B_l directly abut the first planetary gear set RS1 when viewed in the axial direction.

It is furthermore apparent from FIG. 14 that the spatial arrangement of the two clutches C and E axially between the second and third planetary gear sets RS2, RS3, corresponds to the configuration from FIG. 8. The clutch E is axially directly adjacent the second planetary gear set RS2. The clutch C is located axially adjacent the third planetary gear set RS3. To enable the use of identical parts, the disk sets C_l, E_l of the clutches C, E are arranged, by way of example, on the same diameter. The interior disk carrier C_i of the clutch C forms a section of the first shaft 1 of the transmission and is permanently connected to the input shaft AN of the transmission. The interior disk carrier E_i of the clutch E forms a section of the seventh shaft 7 of the transmission and is permanently connected to the sun gear of the second planetary gear set RS2 and the ring gear of the fourth planetary gear set RS4. The exterior disk carrier C_a of the clutch C and the external disck carrier E_a of the clutch E are configured, by way of example, as a common component, and form a section of the fifth shaft 5 of the transmission and are permanently connected to the ring gear of the second planetary gear set RS2 and the sun gear of the third planetary gear set RS3. The servo device C_s of the clutch C, is associated with the disk set C_l, is located on the side of the disk set C_l opposite from the second planetary gear set RS2, and is mounted axially displaceably on the interior disk carrier C_i, to always rotate at the rotational speed of the shaft 1 or the input shaft AN and actuates the disk set C_l axially in the direction of the planetary gear set RS2 during engagement. Pressurants and lubricants can be supplied to the servo device C_s from the input shaft AN in a comparatively simple design, via corresponding ducts. The servo device E_s of the clutch E, is associated with the disk set E_l, is located on the side of the disk set E_l opposite from the second planetary gear set RS2, is mounted axially displaceably on the interior disk carrier E_i, and always rotates at the rotational speed of the shaft 7 and actuates the disk set E_l likewise axially in the direction of the planetary gear set RS2 during engagement. Pressurants and lubricants can be supplied to the servo device E_s from the input shaft AN, via corresponding ducts, by means of a hub section of the interior disk carrier E_i, the section being rotatably mounted on the input shaft AN. To enable the use of identical parts, the two servo devices C_s, E_s may also be configured to have, at least partially, the same design.

It is also apparent from FIG. 14 that the clutch D, unlike that of FIG. 8, from a spatial perspective, is located primarily in a region axially between the first and fourth planetary gear set RS1, RS4. The exterior disk carrier D_a of the clutch D forms a section of the sixth shaft 6 of the transmission and is permanently connected to the planet carrier of the first planetary gear set RS1 and the ring gear of the third planetary gear set RS3, in accordance with the gear shift pattern. Accordingly, the interior disk carrier D_i of the clutch D forms a section of the eighth shaft 8 of the transmission and is permanently connected to the planet carrier of the second planetary gear set RS2, in accordance with the gear shift pattern. The exterior disk carrier D_a is configured as a cylindrical pot that is open towards the planetary gear set RS3, the cylindrical space of this pot in addition to the disk set D_l and also the servo device D_s of the clutch D acting on this disk set D_l are provided in such a way that the servo device D_s actuates the disk set D_l axially in the direction of the planetary gear set RS2 or RS3 upon engagement. The servo device D_s therefore always rotates at the rotational speed of the sixth shaft 6 of the transmission. Pressurants and lubricants can be supplied to the servo device D_s from the input shaft AN, via corresponding ducts, by means of a sun shaft of the planetary gear sets RS1, RS4, is rotatably mounted on the input shaft AN, and by means of a hub of the exterior disk carrier D_a, with the carrier being rotatably mounted on this sun shaft.

In another embodiment it may also be provided that the supply of pressurants and lubricants to the servo device D_s extends, via corresponding ducts of a hub GN, rigidly attached to the transmission housing and, via a sun shaft of the two planetary gear sets RS1, RS4 and a hub of the exterior disk carrier D_a, wherein the aforementioned hub GN is rigidly fixed to the transmission housing, starting from the housing wall GW, and extends axially to the area of the sun gear of the first planetary gear set RS1 or even into the area of the sun gear of the fourth planetary gear set RS4 and in doing so radially encompasses the input shaft AN, and wherein the aforementioned sun shaft is formed by at least one of the two sun gears of the first and fourth planetary gear set RS1, RS4 and is radially rotatably mounted on the hub GN and rigidly attached to the transmission housing, and wherein the aforementioned hub of the exterior disk carrier D_a is mounted rotatably on the aforementioned sun shaft. If, as shown in FIG. 14, a torque converter connected to the input shaft AN is provided as the starting element of the transmission, the hub GN is rigidly attached to the transmission housing may also be configured as an idler shaft of this torque converter, which is then non-rotatably connected to the transmission housing wall (for example by screws).

Figure 15:
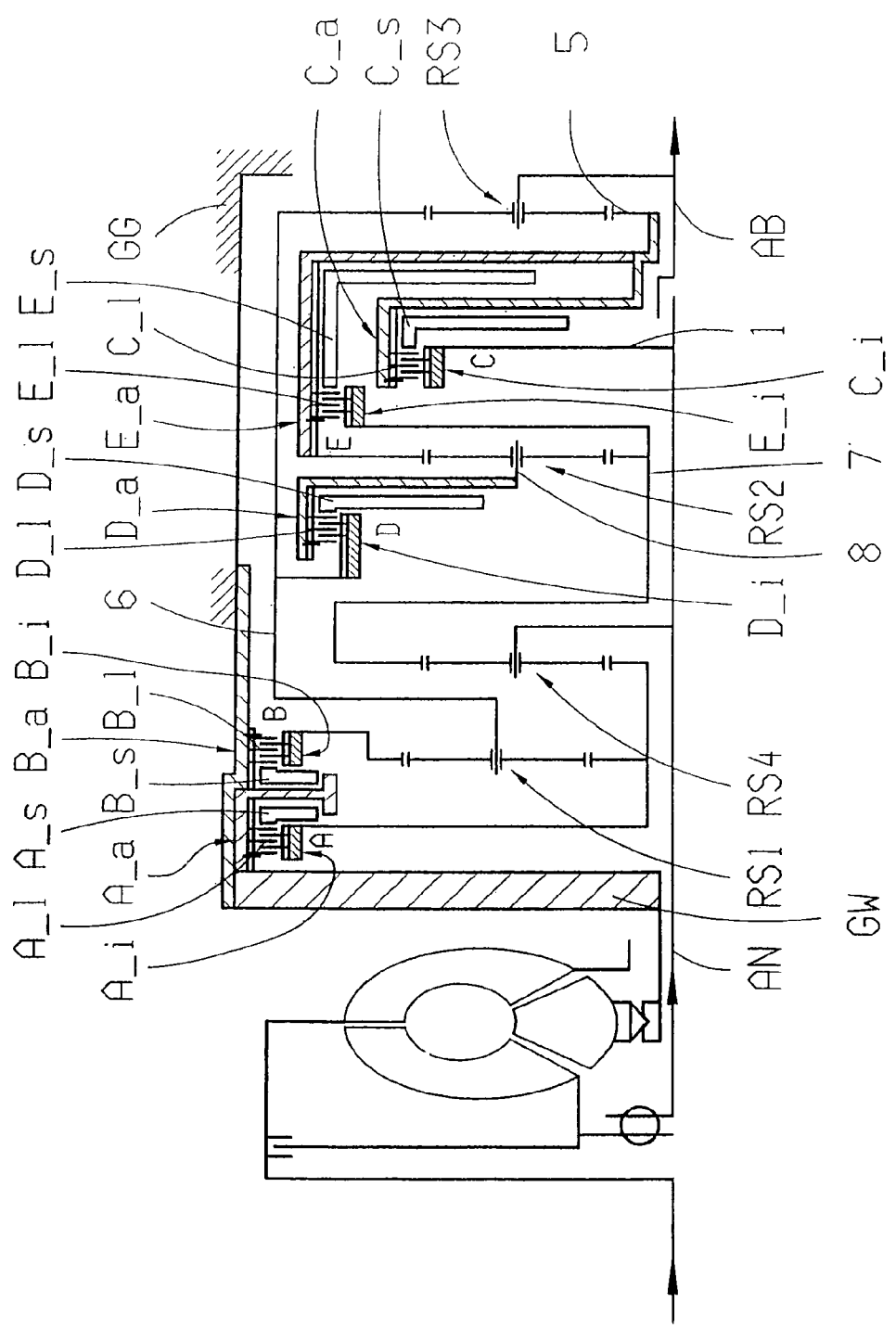
FIG. 15 is a second configuration variant of the multi-speed transmission according to FIG. 8.

FIG. 15 shows an second configuration variant of the multi-speed transmission according to FIG. 8. The essential differences compared to FIG. 8 relate to the design configuration of the clutches D, E and C. As is apparent from FIG. 15, the two brakes A and B are located axially adjacent to one another, similar to FIG. 8, with the disk set B_1 of the brake B from a spatial perspective is arranged in a region radially above the first planetary gear set RS1, and the disk set A_1 of the brake A is located on the side of the brake B facing the input of the transmission in the region of the housing wall GW. With the application of using identical parts the two disk sets A_1, B_1 have the same diameter. The exterior disk carrier B_a of the brake B receive the externally toothed disks of the disk set B_1, which are configured as steel disks, is configured as a separate component with a substantially cylindrical contour and is axially inserted into the transmission housing GG in a non-rotatable manner. The interior disk carrier B_i of the brake B at the outside diameter thereof receives the internally toothed disks of the disk set B_1, which are preferably configured as lining disks, and is permanently connected to the ring gear of the first planetary gear set RS1. The exterior disk carrier A_a of the brake A receives the externally toothed disks of the disk set A_1, which are preferably configured as steel disks, is configured as a separate component with a substantially cylindrical contour and is axially inserted into the exterior disk carrier B_a of the brake B in a non-rotatable manner such that the cylinder base of the exterior disk carrier A_a is located axially between the disk sets A_1 and B_1. The servo device A_s of the brake A acting on the disk set A_1 is located inside the cylindrical space of the exterior disk carrier A_a of the brake A in such a way that the servo device A_s biases the disk set A_1 axially in the direction of the transmission input or axially in the direction opposite from the first planetary gear set RS1 upon engagement. Furthermore, the servo device B_s of the brake B acting on the disk set B_1, is located on the side of the cylinder base of the exterior disk carrier A_a of the brake A, the side facing the disk set B_1, and is mounted axially displaceably on the exterior disk carrier A_a in such a way that the servo device B_s biases the disk pack B_1 axially in the direction opposite from the brake A upon engaging the brake B. The supply of pressurant to the two servo devices A_s, B_s may occur in a simple design via corresponding ducts of the transmission housing GG and the two exterior disk carriers B_a, A_a.

As is furthermore apparent in FIG. 15, the clutch D from a spatial perspective, is located in a region axially between the fourth planetary gear set RS4 and the second planetary gear set RS2, similar to FIG. 8. Unlike FIG. 8, the exterior disk carrier D_a now forms a section of the eighth shaft 8 of the transmission and is permanently connected to the planet carrier of the second planetary gear set RS2, in accordance with the gear shift pattern. Accordingly, different from FIG. 8, the interior disk carrier D_i of the clutch D forms a section of the sixth shaft 6 of the transmission and is permanently connected to the planet carrier of the first planetary gear set RS1 and the ring gear of the third planetary gear set RS3, in accordance with the gear set pattern. The cylindrical exterior disk carrier D_a forms a cylindrical space, inside which both the disk set D_1 of the clutch D and the servo device D_s for actuating the disk set D_1 are arranged. The cylinder base of the exterior disk carrier D_a faces the second planetary gear set RS2 and may be configured as a carrier plate of the planet carrier of the planetary gear set RS2 at the same time. The servo device D_s of the clutch D is mounted axially displaceably on the exterior disk carrier D_a, and always rotates at the rotational speed of the shaft 8 and biases the disk set D_1 axially towards the direction opposite from the planetary gear set RS2 upon engagement. Pressurants and lubricants can be supplied to the servo device D_s from the output shaft AB, for example, via corresponding ducts by means of a section of the shaft 7, the section being rotatably mounted on the output shaft AB and configured as a sun shaft of the planetary gear set RS2, and by means of a hub of the exterior disk carrier D_a, with the hub being rotatably mounted on the aforementioned sun shaft.

Similar to FIG. 8, the clutches C and E in FIG. 15 when viewed from a spatial perspective are located axially between the second planetary gear set RS2 and the third planetary gear set RS3. The interior disk carrier C_i of the clutch C receives the internally toothed disks of the disk set C_1 of the clutch C, which are preferably configured as lining disks, forms a section of the first shaft 1 and is permanently connected to the input shaft AN of the transmission, in accordance with the gear shift pattern. As is indicated in FIG. 15, a radial bearing may be located between the input shaft AN or shaft 1 and the output shaft AB of the transmission. The interior disk carrier E_i of the clutch E receives internally toothed disks of the disk set E_1 of the clutch E, which are preferably configured as lining disks, forms a section of the seventh shaft 7 of the transmission and is permanently connected to the sun gear of the second planetary gear set RS2 and the ring gear of the fourth planetary gear set RS4, in accordance with the gear shift pattern.

Unlike FIG. 8, the clutches C, E according to FIG. 15 are nested inside each other, wherein the disk set C_1 of the clutch C has a smaller diameter than the disk set E_1 of the clutch E and the clutch C is located entirely inside a cylindrical space, which is formed by the exterior disk carrier E_a of the clutch E. For this purpose, both the exterior disk carrier E_a of the clutch E and the exterior disk carrier C_a of the clutch C are configured as cylinders open towards the planetary gear set RS2. The cylindrical section of the exterior disk carrier E_a is non-rotatably connected to the ring gear of the second planetary gear set RS2 (preferably in a detachable manner) and starting from this ring gear extends axially to just in front of the third planetary gear set RS3 and from here transitions in a substantially disk-shaped cylinder base, which then extends radially inward to the sun gear of the third planetary gear set RS3 and is non-rotatably connected to this sun gear. This hub region of the exterior disk carrier E_a is preferably mounted radially on the output shaft AB. On the inside diameter of the cylindrical section of the exterior disk carrier E_a, from a spatial perspective close to the second planetary gear set RS2, the disk set E_1 of the clutch E is provided, wherein the externally toothed disks of this disk set E_1, are configured as steel disks, engage in a corresponding meshing profile of the exterior disk carrier E_a. The servo device E_s acting on the disk set E_1 is likewise provides inside the cylindrical space of the exterior disk carrier E_a on the side of this disk set E_1 facing the third planetary gear set RS3 and operates the disk set E_1 axially in the direction of the second planetary gear set RS2 upon engaging the clutch E. The servo device E_s of the clutch E completely encompasses the cylindrical exterior disk carrier C_a of the clutch C; in other words, the cylindrical exterior disk carrier C_a of the clutch C is located at least substantially inside a cylindrical space formed by the servo device E_s of the clutch E. Inside the cylindrical space of the exterior disk carrier C_a of the clutch C in turn the disk set C_1 of the clutch C and the servo device C_s acting on this disk set C_1 are provided, wherein the disk set C_1 is located adjacent to the interior disk carrier E_1 of the clutch E and the servo device C_s is located on the side of the disk set C_1 facing away from the second planetary gear set RS2 in such a way that the servo device C_s biases the disk set C_1 axially in the direction of the second planetary gear set RS2 upon engaging the clutch C. In the hub region, the cylindrical exterior disk carrier C_a of the clutch C is non-rotatably connected to the hub of the exterior disk carrier E_a of the clutch E and the sun gear of the third planetary gear set RS3. Pressurants and lubricants can be supplied to the two servo devices C_s, E_s from the output shaft, via corresponding ducts, by means of the hub of the exterior disk carrier C_a of the clutch C, the hub being rotatably mounted on the output shaft AB.

Figure 16:
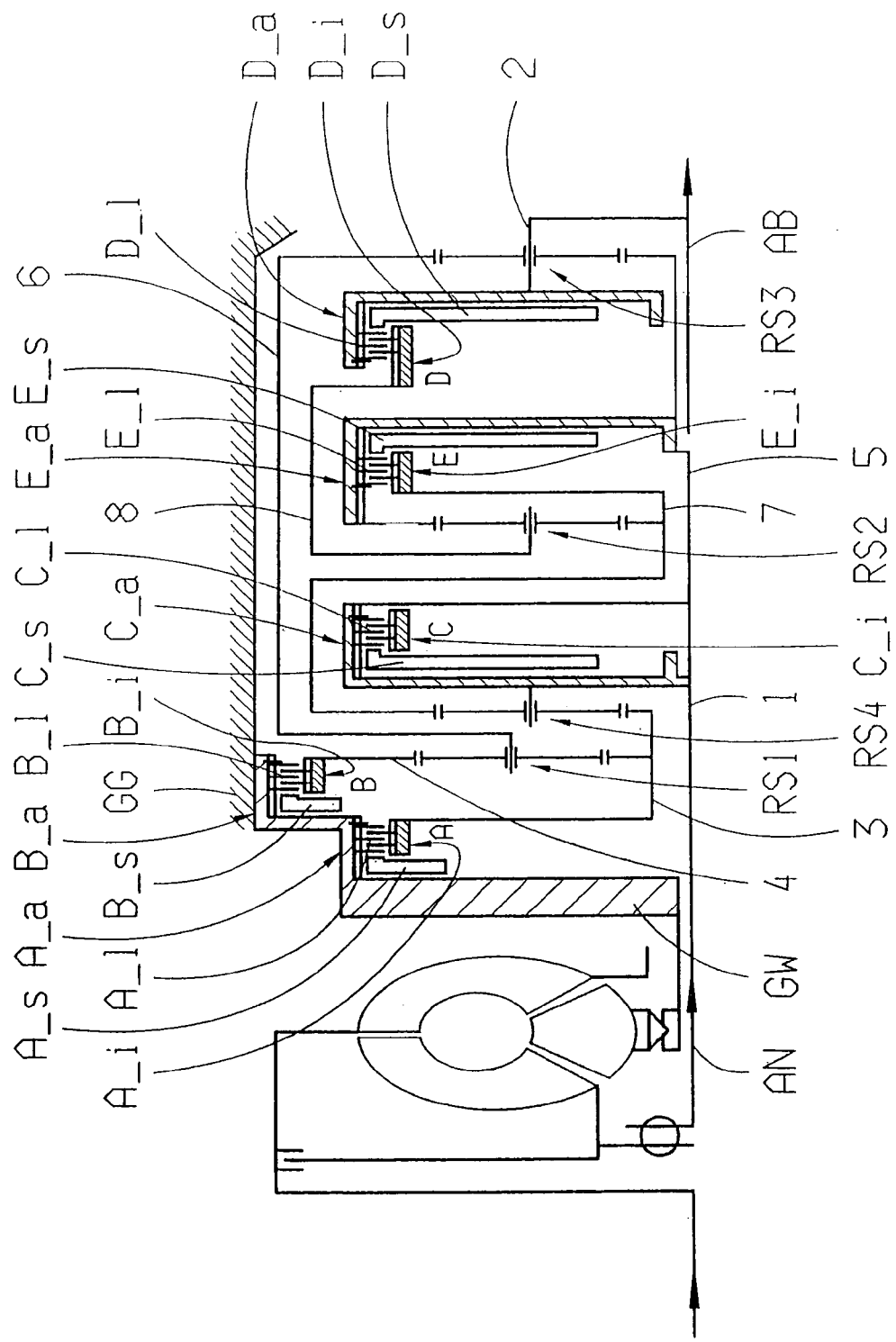
FIG. 16 is a third component configuration variant of the multi-speed transmission according to FIG. 1

In FIG. 16, finally an third component configuration variant for the multi-speed transmission according to FIG. 4 is shown, and is derived from the embodiment variant of the multi-speed transmission according to FIG. 4 described above with reference to FIG. 12. The differences from FIG. 12 relate to the spatial arrangement of the two brakes A and B adjacent to the first planetary gear set RS1 on the input side of the transmission as well as the spatial arrangement of the clutch C in the region between the planetary gear sets.

Viewed in the axial direction, the two brakes A and B are located at least substantially adjacent one another, but when viewed in the radial direction are on top of one another. For one, the brake B is located closer to the first planetary gear set RS1 than the brake A, secondly the brake B is also arranged on a larger diameter than brake A. The disk sets A_l, B_l of the two brakes A, B are located directly adjacent the first planetary gear set RS1. The servo devices A_s, B_s biases these disk sets A_l, B_l are both provided on the side of the respective disk set A_l or B_l facing away from the first planetary gear set RS1. The exterior disk carrier A_a, B_a of the two brakes A, B are integrated into the housing wall GW, which is connected to the transmission housing GG and forms the exterior wall of the transmission housing, with the wall facing the transmission driving motor, which is not shown in detail. The two servo devices A_s, B_s are mounted axially displaceably in this housing wall GW and bias the respectively associated disk set A_l or B_l axially, in the direction of the planetary gear sets, upon engaging the respective brake A or B. The required pressurant is expediently supplied to the servo devices A_s, B_s, via corresponding ducts, which run, at least in sections, inside the housing wall GW.

From a spatial perspective, the clutch C is located in a region axially between the fourth planetary gear set RS4 and the second planetary gear set RS2. The exterior disk carrier C_a of the clutch C forms a section of the first shaft 1 of the transmission and is permanently connected to the input shaft AN of the transmission and the planet carrier of the fourth planetary gear set RS4 in accordance with the gear shift pattern. Accordingly, the interior disk carrier C_i of the clutch C forms a section of the fifth shaft 5 of the transmission and is permanently connected to the sun gear of the third planetary gear set RS3 and, via the exterior disk carrier E_a of the clutch E, to the ring gear of the second planetary gear set RS2 in accordance with the gear shift pattern. At the outside diameter, the interior disk carrier C_i comprises a suitable engaging profile for receiving the internally toothed disks of the disk set C_l of the clutch C, which are preferably configured as lining disks. Geometrically, the exterior disk carrier C_a is configured as a cylindrical pot open towards the second planetary gear set RS2, and comprising a pot base, which directly abuts the fourth planetary gear set RS4, and is connected to the set's planet carrier, and in the region of the inside diameter is connected to the input shaft AN, as well as comprising a cylindrical section, which extends, starting from the outside diameter of the pot base, axially in the direction of the second planetary gear set RS2 and has a suitable engaging profile on the inside diameter for receiving the externally toothed disks of the disk set C_l of the clutch C, which are preferably configured as steel disks. The servo device C_s associated with this disk set C_l is provided inside the cylindrical space, formed by the exterior disk carrier C_a, and is axially displaceably mounted on the exterior disk carrier C_a, and always rotates at the rotational speed of the input shaft AN and biases the disk set C_l axially in the direction of the second planetary gear set upon engaging the clutch C. Pressurants and lubricants can be supplied to the servo device C_s directly from the input shaft AN in a comparatively simple design, via corresponding ducts or bores. Also indicated in FIG. 16 is a possible radial bearing between a hub of the exterior disk carrier C_a of the clutch, with the hub being connected to the input shaft AN and the fifth shaft 5 of the transmission.

The two clutches D and E are located axially adjacent to one another in a region axially between the second and third planetary gear sets RS2, RS3, wherein the clutch D is axially adjacent the third planetary gear set RS3 and wherein the clutch E is axially adjacent the second planetary gear set RS2.

The design configuration of the clutch D is substantially the same as that of FIG. 12. The substantially cylindrical interior disk carrier D_i of the clutch D forms a section of the shaft 8 of the transmission, and receives the interior disks of the disk set D_l of the clutch D, which are preferably configured as lining disks, and on the side of the disk set D_l facing away from the third planetary gear set RS3, is connected to the planet carrier of the second planetary gear set RS2, wherein this section of the shaft 8 radially encompasses the second planetary gear set RS2 and the clutch E in the axial direction. The exterior disk carrier D_a of the clutch D is configured as a cylindrical pot, open toward the planetary gear set RS2, comprising a pot base, which directly abuts the third planetary gear set RS3 and is connected to the set's planet carrier, as well as comprising a cylindrical ring-shaped section, which starting from the outside diameter of the pot base extends axially in the direction of the clutch E or the planetary gear set RS2 and at the inside diameter receives the exterior disks of the disk set D_l of the clutch D, which are preferably configured as steel disks. The servo device D_s associated with the disk set D_l is provided inside the cylindrical space formed by the exterior disk carrier D_a, which is mounted axially displaceably on the exterior disk carrier D_a, and always rotates at the rotational speed of the output shaft AB and biases the disk set D_l axially in the direction of the second planetary gear set RS2 upon engaging the clutch D. Pressurants and lubricants can be supplied to the servo device D_s from the output shaft AB, via corresponding ducts, by means of a sun shaft of the planetary gear set RS3, with the shaft being rotatably mounted on the output shaft AB, and by means of a hub of the exterior disk carrier D_a, the hub is rotatably mounted on the aforementioned sun shaft, and, however for example, also from the output shaft AB, via corresponding ducts, by means of the planet carrier of the third planetary gear set RS3.

The substantially disk-shaped interior disk carrier E_i of the clutch E forms a section of the shaft 7 of the transmission, axially directly adjacent the second planetary gear set RS2, and is connected in the region of the inside diameter thereof to the sun gear of the second planetary gear set RS2 and on the outside diameter thereof receiving the interior disks of the disk set E_l of the clutch E, with the disks preferably being configured as lining disks. The exterior disk carrier E_a of the clutch E is configured as a cylindrical pot open toward the planetary gear set RS2. The disk-shaped pot base of this exterior disk carrier E_a extends in the radial direction axially adjacent to the clutch D on the side of the clutch facing the second planetary gear set. On the inside diameter of the aforementioned pot base, a hub of the exterior disk carrier E_a is provided, which is non-rotatably connected to a shaft section of the shaft 5 penetrating the sun gear of the second planetary gear set RS2 on the one hand, and to the sun shaft of the third planetary gear set RS3, on the other hand. Also indicated in FIG. 16 is a possible radial bearing between the hub of the exterior disk carrier E_a and the output shaft AB. Connected at the outside diameter of the aforementioned pot base, is a cylindrical section of the exterior disk carrier E_a which extends axially in the direction of the second planetary gear set RS2, while passing over the disk set E_l of the clutch E, where it receives, at the inside diameter, the exterior disks of the disk set E_l, which are preferably configured as steel disks, and is non-rotatably connected to the ring gear of the second planetary gear set RS2, preferably in a detachable manner. The servo device E_s of the clutch E, associated with the disk set E_l, is provided inside the cylindrical space formed by the exterior disk carrier E_a, and is mounted axially displaceably on the exterior disk carrier E_a, which always rotates at the rotational speed of the shaft 5 and biases the disk set E_l axially in the direction of the second planetary gear set RS2 upon engaging the clutch E. Pressurants and lubricants can be supplied to the servo device E_s either from the output shaft AB, via corresponding ducts, directly by means of the hub of the exterior disk carrier E_a of the clutch E, or from the input shaft AN, via corresponding ducts, by means of the shaft section of the shaft 5 passing through the sun gear of the second planetary gear set RS2 and the hub of the exterior disk carrier E_a of the clutch E.

Additionally, the following applies to all embodiments of the inventive transmission family illustrated and/or described above:

According to the invention, depending on the stationary transmission ratios of the individual planetary gear sets, different gear steps may be obtained from the same gear shift pattern, allowing application- and/or vehicle-specific variations.

Figure 23:
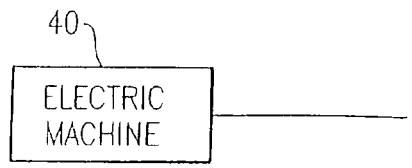
FIG. 23 is a diagrammatic view of a multi-speed transmission with an electric machine.

Furthermore, as shown in FIG. 23, it is possible to provide additional one-way clutches 38 in suitable locations of the multi-speed transmission, for example between a shaft and the housing, or optionally between two shafts.

Figure 17:
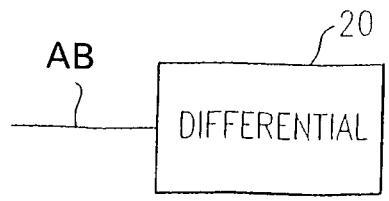
FIG. 17 is a diagrammatic view of a multi-speed transmission with a differential.

On the input side or on the output side, an axle differential 20 and/or a transfer case may be provided, according to the invention, as shown in FIG. 17.

Figure 18:
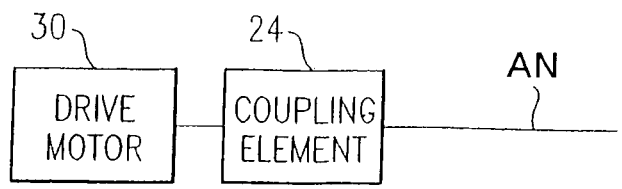
FIG. 18 is a diagrammatic view of a multi-speed transmission with a coupling element and a drive motor.
Figure 19:
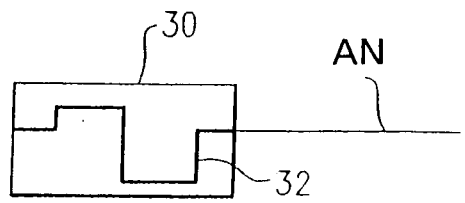
FIG. 19 is a diagrammatic view of a multi-speed transmission with a crankshaft of the drive motor fixed to an input shaft of the multi-speed transmission.
Figure 26:
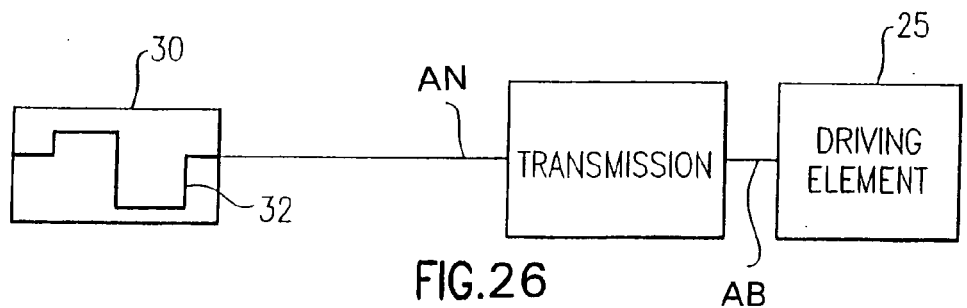
FIG. 26 is a diagrammatic view of a multi-speed transmission with the crankshaft of the drive motor fixed to the input shaft of the multi-speed transmission and the coupling element located behind the multi-speed transmission.

Within the scope of an advantageous further development and shown on FIG. 18, the input shaft AN may be separated from a driving motor 30 as needed by a coupling element 24, wherein the coupling element may be a hydrodynamic converter, a hydraulic clutch, a dry starting clutch, a wet starting clutch, a magnetic powder clutch or a centrifugal clutch. It is also possible, as shown in FIG. 26, to provide such a driving element 23 in the power flow direction behind the transmission, with the input shaft AN being permanently connected to the crankshaft 32 of the drive motor 30, as shown in FIG. 19.

Figure 20:
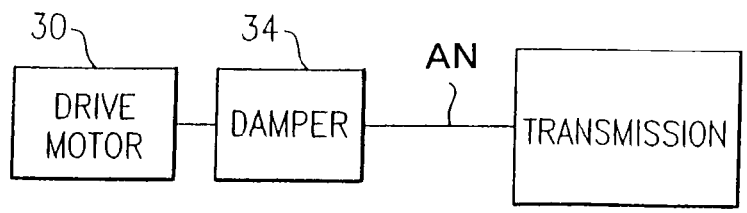
FIG. 20 is a diagrammatic view of a multi-speed transmission having the drive motor communicating with a damper.

The multi-speed transmission, according to the invention, as shown in FIG. 20, also allows provision of a torsional vibration damper 34 between the drive motor 30 and the transmission.

Figure 21:
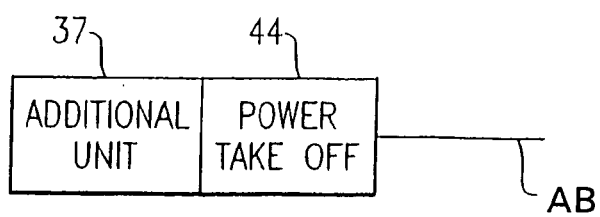
FIG. 21 is a diagrammatic view of a multi-speed transmission with a power take-off for driving an additional unit.
Figure 22:
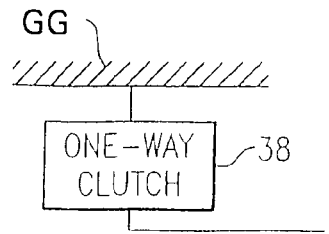
FIG. 22 is a diagrammatic view of a multi-speed transmission having a one-way clutch.
Figure 24:
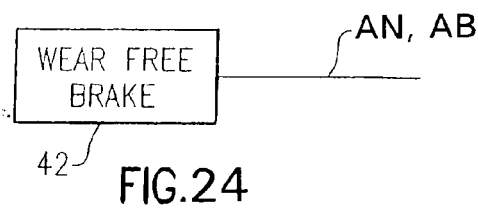
FIG. 24 is a diagrammatic view of a multi-speed transmission having a wear free brake.

Within the scope of a further embodiment of the invention, which is shown in FIG. 24, a wear-free brake 42, such as a hydraulic or electric retarder or the like, may be provided on the input shaft AN or the output shaft AB, which is particularly important when the transmission is used in commercial vehicles. Furthermore, a power take-off 44 may be provided on each shaft, preferably on the input shaft AN or the output shaft AB, to drive additional units 37, as shown in FIG. 21.

The shifting elements used may be configured as power-shift clutches or brakes. In particular, power-shift clutches or brakes such as multi-disk clutches, band brakes and/or cone clutches may be used. Furthermore, it is also possible to use positive brakes and/or clutches, such as synchronization devices or claw clutches as the shifting elements.

Figure 25:
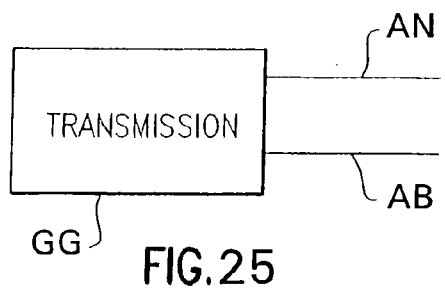
FIG. 25 is a diagrammatic view of the invention with the input and the output being provided on the same side of the multi-speed transmission housing.

A further advantage of the multi-speed transmission presented here and is shown in FIG. 23, is that an electric machine 40 can be additionally provided on each shaft as a generator and/or as an additional drive unit. Additionally, as shown in FIG. 25, the input and the output are provided on the same side of the housing GG.

Of course, any design configuration, particularly any spatial configuration of the planetary gear sets and the shifting elements as such, as well as in relation to each other, to the extent they are technically expedient, falls under the scope of protection of the present claims, without influencing the function of the transmission as described in the claims, even if these embodiments are not explicitly illustrated in the figures or mentioned in the description.

REFERENCE NUMERALS

1 First shaft
2 Second shaft
3 Third shaft
4 Fourth shaft
5 Fifth shaft
6 Sixth shaft
7 Seventh shaft
8 Eighth shaft
A First shifting element, first brake
A_a Exterior disk carrier of the first shifting element
A_i Interior disk carrier of the first shifting element
A_l Disk set of the first shifting element
A_s Servo device of the first shifting element
B Second shifting element, second brake
B_a Exterior disk carrier of the second shifting element
B_i Interior disk carrier of the second shifting element
B_l Disk set of the second shifting element
B_s Servo device of the second shifting element
C Third shifting element, first clutch
C_a Exterior disk carrier of the third shifting element
C_i Interior disk carrier of the third shifting element
C_l Disk set of the third shifting element
C_s Servo device of the third shifting element
D Fourth shifting element, second clutch
D_a Exterior disk carrier of the fourth shifting element
D_i Interior disk carrier of the fourth shifting element
D_l Disk set of the fourth shifting element
D_s Servo device of the fourth shifting element
E Fifth shifting element, third clutch
E_a Exterior disk carrier of the fifth shifting element
E_i Interior disk carrier of the fifth shifting element
E_l Disk set of the fifth shifting element
E_s Servo device of the fifth shifting element
AN Input shaft
AB Output shaft
GG Housing
GN Hub rigidly attached to the housing
GW Housing wall
RS1 First planetary gear set
HO1 Ring gear of the first planetary gear set
SO1 Sun gear of the first planetary gear set
ST1 Planet carrier of the first planetary gear set
PL1 Planet gears of the first planetary gear set
RS2 Second planetary gear set
HO2 Ring gear of the second planetary gear set
SO2 Sun gear of the second planetary gear set
ST2 Planet carrier of the second planetary gear set
PL2 Planet gears of the second planetary gear set RS3 Third planetary gear set
HO3 Ring gear of the third planetary gear set
Sun gear of the third planetary gear set
Planet carrier of the third planetary gear set
PL3 Planet gears of the third planetary gear set
RS4 Fourth planetary gear set
HO4 Ring gear of the fourth planetary gear set
SO4 Sun gear of the fourth planetary gear set
ST4 Planet carrier of the fourth planetary gear set
PL4 Planet gears of the fourth planetary gear set
i Gear ratio
φ Progressive ratio

The invention claimed is:

1. A multi-speed automatic transmission of a planetary design for a motor vehicle, the transmission comprising:
an input shaft (AN) and an output shaft (AB);
first, second, third and fourth planetary gear sets (RS1, RS2, RS3, RS4), each of the first planetary gear set (RS1), the second planetary gear set (RS2), the third planetary gear set (RS3) and the fourth planetary gear set (RS4) comprise a sun gear, a planet carrier and a ring gear;
at least first, second, third, fourth, fifth, sixth, seventh and eighth rotatable shafts (1, 2, 3, 4, 5, 6, 7, 8) and first, second, third, fourth and fifth shifting elements (A, B, C, D, E), whose selective engagement defines different gear ratios between the input shaft (AN) and the output shaft (AB) such that eight forward gears and at least one reverse gear can be implemented;
wherein the planet carrier (ST4) of the fourth planetary gear set (RS4) and the input shaft (AN) are coupled and form the first shaft (1);
the planet carrier (ST3) of the third planetary gear set (RS3) and the output shaft (AB) are coupled and form the second shaft (2);
the sun gear (SO1) of the first planetary gear set (RS1) and the sun gear (SO4) of the fourth planetary gear set (RS4) are coupled and form the third shaft (3) of the transmission;
the ring gear (HO1) of the first planetary gear set (RS1) forms the fourth shaft (4);
the ring gear (HO2) of the second planetary gear set (RS2) and the sun gear (SO3) of the third planetary gear set (RS3) are coupled and form the fifth shaft (5);
the planet carrier (ST1) of the first planetary gear set (RS1) and the ring gear (HO3) of the third planetary gear set (RS3) are coupled and form the sixth shaft (6);
the sun gear (SO1) of the second planetary gear set (RS2) and the ring gear (HO4) of the fourth planetary gear set (RS4) are coupled and form the seventh shaft (7);
the planet carrier (ST2) of the second planetary gear set (RS2) forms the eighth shaft (8);
the first shifting element (A) is located between the third shaft (3) and a housing (GG) of the transmission;
the second shifting element (B) is located between the fourth shaft (4) and the housing (GG) of the transmission;
the third shifting element (C) is located in a power flow between the fifth shaft (5) and the first shaft (1);
the fourth shifting element (D) is located in the power flow between one of the eighth shaft (8) and the second shaft (2) and the eighth shaft (8) and the sixth shaft (6); and
the fifth shifting element (E) is located in the power flow between one of the seventh shaft (7) and the fifth shaft (5), the seventh shaft (7) and the eighth shaft (8) and the fifth shaft (5) and the eighth shaft (8).

2. The multi-speed transmission according to claim 1, wherein
a first gear results from engagement of the first shifting element (A), the second shifting element (B) and the third shifting element (C);
a second gear results from engagement of the first shifting element (A), the second shifting element (B) and the fifth shifting element (E);
a third gear results from engagement of the second shifting element (B), the third shifting element (C) and the fifth shifting element (E);
a fourth gear results from engagement of the second shifting element (B), the fourth shifting element (D) and the fifth shifting element (E);
a fifth gear results from engagement of the second shifting element (B), the third shifting element (C) and the fourth shifting element (D);
a sixth gear results from engagement of the third shifting element (C), the fourth shifting element (D) and the fifth shifting element (E);
a seventh gear results from engagement of the first shifting element (A), the third shifting element (C) and the fourth shifting element (D);
an eighth gear results from engagement of the first shifting element (A), the fourth shifting element (D) and the fifth shifting element (E); and
the reverse gear results from engagement of the first shifting element (A), the second shifting element (B) and the fourth shifting element (D).

3. The multi-speed transmission according to claim 1, wherein the first planetary gear set (RS1), the second planetary gear set (RS2), the third planetary gear set (RS3) and the fourth planetary gear set (RS4) are negative planetary gear sets.

4. The multi-speed transmission according to claim 1, wherein the second shift element (B) is at least partially located on a side of the first planetary gear set (RS1) opposite the fourth planetary gear set (RS4).

5. The multi-speed transmission according to claim 1, wherein the second shift element (B) is positioned at least partially radially above the first planetary gear set (RS1).

6. The multi-speed transmission according to claim 1, wherein the first shift element (A) and the second shift element (B) are at least partially axially adjacent.

7. The multi-speed transmission according to claim 1, wherein the third shift element (C) is substantially axially located between the fifth shift element (E) and the fourth shift element (D).

8. The multi-speed transmission according to claim 1, wherein the first planetary gear set (RS1), the second planetary gear set (RS2), the third planetary gear set (RS3) and the fourth planetary gear set (RS4) are coaxial and sequentially arranged in the order of:
the second planetary gear set (RS2), the fourth planetary gear set (RS4), the first planetary gear set (RS1) and the third planetary gear set (RS3).

9. The multi-speed transmission according to claim 1, wherein a coupling element separates the input shaft (AN) from a drive motor of the motor vehicle and the coupling element is one of a hydrodynamic converter, a hydraulic clutch, a dry starting clutch, a wet starting clutch, a magnetic powder clutch and a centrifugal clutch.

10. The multi-speed transmission according to claim 1, wherein driving the motor vehicle is initiated by one of the first shifting element (A), the second shifting element (B), the third shifting element (C) and the fourth shifting element (D), the input shaft (AN) is connected to a crankshaft of a driving motor in one of a rotationally fixed and a rotationally flexible manner and initiating driving the motor vehicle in a forward direction and initiating driving the motor vehicle in a reverse direction is accomplished by engagement of one of the first shifting element (A) and the second shifting element (B).

11. The multi-speed transmission according to claim 1, wherein the first planetary gear set (RS1), the second planetary gear set (RS2), the third planetary gear set (RS3) and the fourth planetary gear set (RS4) are coaxial and sequentially arranged in the order of:
the first planetary gear set (RS1), the fourth planetary gear set (RS4), the second planetary gear set (RS2) and the third planetary gear set (RS3).

12. The multi-speed transmission according to claim 11, wherein at most a single one of the first shaft (1), the second shaft (2), the third shaft (3), the fourth shaft (4), the fifth shaft (5), the sixth shaft (6), the seventh shaft (7) and the eighth shaft (8) axially extends centrally through the first planetary gear set (RS1), the second planetary gear set (RS2), the third planetary gear set (RS3) and the fourth planetary gear set (RS4).

13. The multi-speed transmission according to claim 11, wherein the third shaft (3) is rotatably supported on a hub (GN) which is fixed to the housing (GG) of the transmission.

14. The multi-speed transmission according to claim 11, wherein, when viewed spatially, the first shifting element (A) is at least partially located on a side of the first planetary gear set (RS1) opposite the fourth planetary gear set (RS4).

15. The multi-speed transmission according to claim 11, wherein, when viewed spatially, the second shifting element (B) is arranged at least substantially radially over the first shifting element (A).

16. The multi-speed transmission according to claim 11, wherein the fifth shifting element (E) is axially directly adjacent the second planetary gear set (RS2).

17. The multi-speed transmission according to claim 11, wherein, when viewed spatially, the fourth shifting element (D) and the fifth shifting element (E) are axially located between the second planetary gear set (RS2) and the third planetary gear set (RS3).

18. The multi-speed transmission according to claim 11, wherein, when viewed spatially, the third shifting element (C) is at least substantially located axially between the second planetary gear set (RS2) and the third planetary gear set (RS3).

19. The multi-speed transmission according to claim 11, wherein, when viewed spatially, the third shifting element (C) and the fifth shifting element (E) are substantially axially adjacent.

* * * * *